US009495322B1

(12) United States Patent
Belin et al.

(10) Patent No.: US 9,495,322 B1
(45) Date of Patent: Nov. 15, 2016

(54) COVER DISPLAY

(75) Inventors: Gilles Jean Roger Belin, Seattle, WA (US); Hannah Rebecca Lewbel, Campbell, CA (US)

(73) Assignee: Amazon Technologies, Inc., Reno, NV (US)

( * ) Notice: Subject to any disclaimer, the term of this patent is extended or adjusted under 35 U.S.C. 154(b) by 1107 days.

(21) Appl. No.: 12/886,877

(22) Filed: Sep. 21, 2010

(51) Int. Cl.
*G06F 15/02* (2006.01)
*G06F 1/16* (2006.01)

(52) U.S. Cl.
CPC ......... *G06F 15/0208* (2013.01); *G06F 1/1613* (2013.01)

(58) Field of Classification Search
CPC combination set(s) only.
See application file for complete search history.

(56) References Cited

U.S. PATENT DOCUMENTS

| | | |
|---|---|---|
| 4,622,627 A | 11/1986 | Rodriguez et al. |
| 4,985,697 A | 1/1991 | Boulton |
| 5,418,549 A | 5/1995 | Anderson et al. |
| 5,495,268 A | 2/1996 | Pearson et al. |
| 5,499,359 A | 3/1996 | Vijaykumar |
| 5,517,407 A | 5/1996 | Weiner |
| 5,544,305 A | 8/1996 | Ohmaye et al. |
| 5,566,098 A | 10/1996 | Lucente et al. |
| 5,600,775 A | 2/1997 | King et al. |
| 5,623,260 A | 4/1997 | Jones |
| 5,630,159 A | 5/1997 | Zancho |
| 5,640,553 A | 6/1997 | Schultz |
| 5,659,742 A | 8/1997 | Beattie et al. |
| 5,661,635 A | 8/1997 | Huffman et al. |
| 5,663,748 A | 9/1997 | Huffman et al. |
| 5,696,982 A | 12/1997 | Tanigawa et al. |
| 5,710,922 A | 1/1998 | Alley et al. |
| 5,742,905 A | 4/1998 | Pepe et al. |
| 5,761,485 A | 6/1998 | Munyan |
| 5,765,168 A | 6/1998 | Burrows |
| 5,774,109 A | 6/1998 | Winksy et al. |
| 5,813,017 A | 9/1998 | Morris |
| 5,845,278 A | 12/1998 | Kirsch et al. |
| 5,845,301 A | 12/1998 | Rivette et al. |
| 5,847,698 A | 12/1998 | Reavey et al. |
| 5,892,900 A | 4/1999 | Ginter et al. |
| 5,923,861 A | 7/1999 | Bertram et al. |
| 5,930,026 A | 7/1999 | Jacobson et al. |
| 5,940,846 A | 8/1999 | Akiyama |
| 5,956,048 A | 9/1999 | Gaston |
| 5,960,411 A | 9/1999 | Hartman et al. |

(Continued)

FOREIGN PATENT DOCUMENTS

| | | |
|---|---|---|
| CN | 1362682 | 8/2002 |
| CN | 1841373 | 10/2006 |

(Continued)

OTHER PUBLICATIONS

Office action for U.S. Appl. No. 13/070,328, mailed on Aug. 12, 2014, Rachabathuni, "Last Screen Rendering for Electronic Book Readers", 6 pages.

(Continued)

*Primary Examiner* — Said Broome
(74) *Attorney, Agent, or Firm* — Lee & Hayes, PLLC

(57) ABSTRACT

A cover for an electronic device, such as a dedicated handheld electronic book ("eBook") reader device, is described. The eBook cover has one or more integral displays, which are used to display various information that may or may not be related to the eBook that is being consumed on the eBook reader device.

36 Claims, 19 Drawing Sheets

(56) References Cited

U.S. PATENT DOCUMENTS

| | | |
|---|---|---|
| 5,973,681 A | 10/1999 | Tanigawa et al. |
| 5,991,439 A | 11/1999 | Tanaka et al. |
| 6,018,575 A | 1/2000 | Gross et al. |
| 6,037,954 A | 3/2000 | McMahon |
| 6,041,335 A | 3/2000 | Merritt et al. |
| 6,047,189 A | 4/2000 | Yun et al. |
| 6,049,334 A | 4/2000 | Bates et al. |
| 6,049,796 A | 4/2000 | Siitonen et al. |
| 6,064,980 A | 5/2000 | Jacobi et al. |
| 6,073,148 A | 6/2000 | Rowe et al. |
| 6,113,394 A | 9/2000 | Edgar |
| 6,148,340 A | 11/2000 | Bittinger et al. |
| 6,154,757 A | 11/2000 | Krause et al. |
| 6,164,974 A | 12/2000 | Carlile et al. |
| 6,195,698 B1 | 2/2001 | Lillibridge et al. |
| 6,201,771 B1 | 3/2001 | Otsuka et al. |
| 6,226,642 B1 | 5/2001 | Beranek et al. |
| 6,233,318 B1 | 5/2001 | Picard et al. |
| 6,272,461 B1 | 8/2001 | Meredith et al. |
| 6,300,947 B1 | 10/2001 | Kanevsky |
| 6,308,320 B1 | 10/2001 | Burch |
| 6,313,828 B1 | 11/2001 | Chombo |
| 6,331,866 B1 | 12/2001 | Eisenberg |
| 6,331,867 B1 | 12/2001 | Eberhard et al. |
| 6,335,678 B1 | 1/2002 | Heutschi |
| 6,351,750 B1 | 2/2002 | Duga et al. |
| 6,385,596 B1 | 5/2002 | Wiser et al. |
| 6,401,086 B1 | 6/2002 | Bruckner |
| 6,401,239 B1 | 6/2002 | Miron |
| 6,442,651 B2 | 8/2002 | Crow et al. |
| 6,449,627 B1 | 9/2002 | Baer et al. |
| 6,457,030 B1 | 9/2002 | Adams et al. |
| 6,466,951 B1 | 10/2002 | Birkler et al. |
| 6,484,212 B1 | 11/2002 | Markowitz et al. |
| 6,487,669 B1 | 11/2002 | Waring |
| 6,493,734 B1 | 12/2002 | Sachs et al. |
| 6,496,803 B1 | 12/2002 | Seet et al. |
| 6,512,497 B1 * | 1/2003 | Kondo .............. G06F 3/147 345/1.1 |
| 6,529,920 B1 | 3/2003 | Arons et al. |
| 6,535,857 B1 | 3/2003 | Clarke, III et al. |
| 6,542,874 B1 | 4/2003 | Walker et al. |
| 6,559,882 B1 | 5/2003 | Kerchner |
| 6,560,699 B1 | 5/2003 | Konkle |
| 6,574,658 B1 | 6/2003 | Gabber et al. |
| 6,629,138 B1 | 9/2003 | Lambert et al. |
| 6,631,495 B2 | 10/2003 | Kato et al. |
| 6,642,947 B2 | 11/2003 | Feierbach |
| 6,658,623 B1 | 12/2003 | Schilit et al. |
| 6,685,482 B2 | 2/2004 | Hopp et al. |
| 6,687,878 B1 | 2/2004 | Eintracht et al. |
| 6,704,733 B2 | 3/2004 | Clark et al. |
| 6,712,701 B1 * | 3/2004 | Boylan, III .......... G06Q 50/34 463/42 |
| 6,721,869 B1 | 4/2004 | Senthil |
| 6,724,403 B1 | 4/2004 | Santoro et al. |
| 6,725,227 B1 | 4/2004 | Li |
| 6,726,487 B1 | 4/2004 | Dalstrom |
| 6,735,583 B1 | 5/2004 | Bjarnestam et al. |
| 6,744,891 B1 | 6/2004 | Allen |
| 6,744,967 B2 | 6/2004 | Kaminski et al. |
| 6,801,751 B1 | 10/2004 | Wood et al. |
| 6,803,930 B1 | 10/2004 | Simonson |
| 6,804,489 B2 | 10/2004 | Stuppy et al. |
| 6,829,594 B1 | 12/2004 | Kitamura |
| 6,847,966 B1 | 1/2005 | Sommer et al. |
| 6,904,449 B1 | 6/2005 | Quinones |
| 6,912,398 B1 | 6/2005 | Domnitz |
| 6,933,928 B1 | 8/2005 | Lilienthal |
| 6,938,076 B2 | 8/2005 | Meyer et al. |
| 6,947,922 B1 | 9/2005 | Glance |
| 6,948,135 B1 | 9/2005 | Ruthfield et al. |
| 6,953,343 B2 | 10/2005 | Townshend |
| 6,966,029 B1 | 11/2005 | Ahern |
| 6,980,652 B1 | 12/2005 | Braitberg et al. |
| 6,985,932 B1 | 1/2006 | Glaser et al. |
| 6,992,687 B1 | 1/2006 | Baird et al. |
| 6,999,565 B1 | 2/2006 | Delaney et al. |
| 7,007,015 B1 | 2/2006 | Nayak |
| 7,009,596 B2 | 3/2006 | Seet et al. |
| 7,010,500 B2 | 3/2006 | Aarnio |
| 7,010,751 B2 | 3/2006 | Shneiderman |
| 7,020,654 B1 | 3/2006 | Najmi |
| 7,020,663 B2 | 3/2006 | Hay et al. |
| 7,054,914 B2 | 5/2006 | Suzuki et al. |
| 7,057,591 B1 | 6/2006 | Hautanen et al. |
| 7,062,707 B1 | 6/2006 | Knauft et al. |
| 7,071,930 B2 | 7/2006 | Kondo et al. |
| 7,089,292 B1 | 8/2006 | Roderick et al. |
| 7,092,116 B2 | 8/2006 | Calaway |
| 7,103,848 B2 | 9/2006 | Barsness et al. |
| 7,107,533 B2 | 9/2006 | Duncan et al. |
| 7,111,250 B1 | 9/2006 | Hayward et al. |
| 7,130,841 B1 | 10/2006 | Goel et al. |
| 7,133,506 B1 | 11/2006 | Smith |
| 7,142,195 B2 * | 11/2006 | Northway ............ G06F 1/1626 345/169 |
| 7,149,776 B1 | 12/2006 | Roy et al. |
| 7,165,217 B1 | 1/2007 | Kondo |
| 7,181,502 B2 | 2/2007 | Incertis |
| 7,188,085 B2 | 3/2007 | Pelletier |
| 7,191,346 B2 | 3/2007 | Abe et al. |
| 7,209,888 B2 | 4/2007 | Frid-Nielsen et al. |
| 7,216,116 B1 | 5/2007 | Nilsson et al. |
| 7,237,123 B2 | 6/2007 | LeVine et al. |
| 7,246,118 B2 | 7/2007 | Chastain et al. |
| 7,249,046 B1 | 7/2007 | Katsurabayashi et al. |
| 7,249,060 B2 | 7/2007 | Ling |
| 7,249,324 B2 | 7/2007 | Nakamura et al. |
| 7,257,577 B2 | 8/2007 | Fagin et al. |
| 7,287,068 B1 | 10/2007 | Eriksson et al. |
| 7,290,285 B2 | 10/2007 | McCurdy et al. |
| 7,298,851 B1 | 11/2007 | Hendricks et al. |
| 7,304,635 B2 | 12/2007 | Seet et al. |
| 7,310,629 B1 | 12/2007 | Mendelson et al. |
| 7,313,759 B2 | 12/2007 | Sinisi |
| 7,340,436 B1 | 3/2008 | Lilge |
| 7,350,704 B2 | 4/2008 | Barsness et al. |
| 7,355,591 B2 | 4/2008 | Sugimoto |
| 7,375,649 B2 | 5/2008 | Gueziec |
| 7,383,505 B2 | 6/2008 | Shimizu et al. |
| 7,386,480 B2 | 6/2008 | Sarig |
| 7,386,804 B2 | 6/2008 | Ho et al. |
| 7,398,244 B1 | 7/2008 | Keith |
| 7,401,286 B1 | 7/2008 | Hendricks et al. |
| 7,414,830 B2 * | 8/2008 | Weinstein ........... G06F 1/1626 361/679.27 |
| 7,454,238 B2 | 11/2008 | Vinayak et al. |
| 7,461,406 B2 | 12/2008 | Pelly et al. |
| 7,496,767 B2 | 2/2009 | Evans |
| 7,506,246 B2 | 3/2009 | Hollander et al. |
| 7,506,356 B2 | 3/2009 | Gupta et al. |
| 7,509,270 B1 | 3/2009 | Hendricks et al. |
| 7,511,948 B2 * | 3/2009 | Hirayama ........... G06F 1/1601 345/168 |
| 7,519,278 B2 | 4/2009 | Ikeda et al. |
| 7,533,152 B2 | 5/2009 | Stark et al. |
| 7,539,478 B2 | 5/2009 | Herley et al. |
| 7,562,032 B2 | 7/2009 | Abbosh et al. |
| 7,574,653 B2 | 8/2009 | Croney et al. |
| 7,631,013 B2 | 12/2009 | Parsons et al. |
| 7,634,429 B2 | 12/2009 | Narin et al. |
| 7,656,127 B1 | 2/2010 | Shutt et al. |
| 7,657,459 B2 | 2/2010 | Anderson et al. |
| 7,657,831 B2 | 2/2010 | Donahue |
| 7,680,849 B2 | 3/2010 | Heller et al. |
| 7,716,224 B2 | 5/2010 | Reztlaff, II et al. |
| 7,720,892 B1 | 5/2010 | Healey, Jr. et al. |
| 7,747,949 B2 | 6/2010 | Incertis Carro |
| 7,760,986 B2 | 7/2010 | Beuque |
| 7,788,369 B2 | 8/2010 | McAllen et al. |
| 7,792,756 B2 | 9/2010 | Plastina et al. |
| 7,835,989 B1 | 11/2010 | Hendricks et al. |
| 7,849,393 B1 | 12/2010 | Hendricks et al. |

(56) References Cited

U.S. PATENT DOCUMENTS

| | | |
|---|---|---|
| 7,865,405 B2 | 1/2011 | Hendricks et al. |
| 7,865,567 B1 | 1/2011 | Hendricks et al. |
| 7,865,817 B2 | 1/2011 | Ryan et al. |
| 7,870,022 B2 | 1/2011 | Bous et al. |
| 7,890,848 B2 | 2/2011 | Bodin et al. |
| 7,900,133 B2 | 3/2011 | Cragun et al. |
| 7,908,628 B2 | 3/2011 | Swart et al. |
| 7,920,112 B2 | 4/2011 | Kurihara et al. |
| 7,920,320 B2 | 4/2011 | Watson et al. |
| 8,018,431 B1 | 9/2011 | Zehr et al. |
| 8,117,128 B2 | 2/2012 | Ishibashi |
| 8,131,647 B2 | 3/2012 | Siegel et al. |
| 8,161,198 B2 | 4/2012 | Kikuchi |
| 8,165,998 B2 | 4/2012 | Semerdzhiev |
| 8,175,925 B1 | 5/2012 | Rouaix |
| 8,209,623 B2 | 6/2012 | Barletta et al. |
| 8,260,915 B1 | 9/2012 | Ashear |
| 8,312,096 B2 | 11/2012 | Cohen et al. |
| 8,341,210 B1 | 12/2012 | Lattyak et al. |
| 8,370,196 B2 | 2/2013 | Choi et al. |
| 8,417,772 B2 | 4/2013 | Lin et al. |
| 8,429,028 B2 | 4/2013 | Hendricks et al. |
| 8,452,797 B1 | 5/2013 | Paleja et al. |
| 8,510,247 B1 | 8/2013 | Kane, Jr. et al. |
| 8,601,084 B2 | 12/2013 | Carlander |
| 8,692,763 B1 | 4/2014 | Kim |
| 8,725,565 B1 | 5/2014 | Ryan |
| 8,793,575 B1 | 7/2014 | Lattyak et al. |
| 2001/0007980 A1 | 7/2001 | Ishibashi et al. |
| 2001/0025302 A1 | 9/2001 | Suzuki et al. |
| 2001/0026287 A1 | 10/2001 | Watanabe |
| 2001/0027450 A1 | 10/2001 | Shinoda et al. |
| 2001/0027478 A1 | 10/2001 | Meier et al. |
| 2001/0036822 A1 | 11/2001 | Mead et al. |
| 2001/0037328 A1 | 11/2001 | Pustejovsky et al. |
| 2001/0039493 A1 | 11/2001 | Pustejovsky et al. |
| 2001/0049623 A1 | 12/2001 | Aggarwal et al. |
| 2001/0050658 A1* | 12/2001 | Adams ................... 345/4 |
| 2001/0053975 A1 | 12/2001 | Kurihara |
| 2002/0002540 A1 | 1/2002 | DeMello et al. |
| 2002/0010707 A1 | 1/2002 | Chang et al. |
| 2002/0010759 A1 | 1/2002 | Hitson et al. |
| 2002/0026443 A1 | 2/2002 | Chang et al. |
| 2002/0046261 A1 | 4/2002 | Iwata et al. |
| 2002/0049717 A1 | 4/2002 | Routtenberg et al. |
| 2002/0057286 A1 | 5/2002 | Markel et al. |
| 2002/0059415 A1 | 5/2002 | Chang et al. |
| 2002/0069222 A1 | 6/2002 | McNeely |
| 2002/0069312 A1 | 6/2002 | Jones |
| 2002/0087532 A1 | 7/2002 | Barritz et al. |
| 2002/0090934 A1 | 7/2002 | Mitchelmore |
| 2002/0091584 A1 | 7/2002 | Clark et al. |
| 2002/0092031 A1 | 7/2002 | Dudkiewicz et al. |
| 2002/0095468 A1 | 7/2002 | Sakata |
| 2002/0101447 A1 | 8/2002 | Carro |
| 2002/0103809 A1 | 8/2002 | Starzl et al. |
| 2002/0120635 A1 | 8/2002 | Joao |
| 2002/0123336 A1 | 9/2002 | Kamada |
| 2002/0126140 A1 | 9/2002 | Gorbet et al. |
| 2002/0129012 A1 | 9/2002 | Green |
| 2002/0138291 A1 | 9/2002 | Vaidyanathan et al. |
| 2002/0138649 A1 | 9/2002 | Cartmell et al. |
| 2002/0143822 A1 | 10/2002 | Brid et al. |
| 2002/0147724 A1 | 10/2002 | Fries et al. |
| 2002/0165707 A1 | 11/2002 | Call |
| 2002/0184319 A1 | 12/2002 | Willner et al. |
| 2002/0194474 A1 | 12/2002 | Natsuno et al. |
| 2003/0005002 A1 | 1/2003 | Chen et al. |
| 2003/0012216 A1 | 1/2003 | Novaes |
| 2003/0018720 A1 | 1/2003 | Chang et al. |
| 2003/0025731 A1 | 2/2003 | Chastain et al. |
| 2003/0028395 A1 | 2/2003 | Rodgers et al. |
| 2003/0040970 A1 | 2/2003 | Miller |
| 2003/0046233 A1 | 3/2003 | Ara et al. |
| 2003/0052928 A1 | 3/2003 | Williams |
| 2003/0058265 A1 | 3/2003 | Robinson et al. |
| 2003/0065642 A1 | 4/2003 | Zee |
| 2003/0069812 A1 | 4/2003 | Yuen et al. |
| 2003/0076513 A1 | 4/2003 | Sugimoto et al. |
| 2003/0090572 A1 | 5/2003 | Belz et al. |
| 2003/0093312 A1 | 5/2003 | Ukita et al. |
| 2003/0093382 A1 | 5/2003 | Himeno et al. |
| 2003/0097354 A1 | 5/2003 | Finlay et al. |
| 2003/0097361 A1 | 5/2003 | Huang et al. |
| 2003/0105679 A1 | 6/2003 | Krishnan et al. |
| 2003/0110503 A1 | 6/2003 | Perkes |
| 2003/0126123 A1 | 7/2003 | Kodama |
| 2003/0163399 A1 | 8/2003 | Harper et al. |
| 2003/0164844 A1 | 9/2003 | Kravitz et al. |
| 2003/0182551 A1 | 9/2003 | Frantz et al. |
| 2003/0190145 A1 | 10/2003 | Copperman et al. |
| 2003/0191737 A1 | 10/2003 | Steele et al. |
| 2003/0204496 A1 | 10/2003 | Ray et al. |
| 2004/0002943 A1 | 1/2004 | Merrill et al. |
| 2004/0003344 A1 | 1/2004 | Lai et al. |
| 2004/0003398 A1 | 1/2004 | Donian et al. |
| 2004/0030686 A1 | 2/2004 | Cardno et al. |
| 2004/0044723 A1 | 3/2004 | Bell et al. |
| 2004/0049743 A1* | 3/2004 | Bogward ................... 715/531 |
| 2004/0054499 A1 | 3/2004 | Starzyk et al. |
| 2004/0068471 A1 | 4/2004 | Kato |
| 2004/0078273 A1 | 4/2004 | Loeb et al. |
| 2004/0078757 A1 | 4/2004 | Golovchinsky et al. |
| 2004/0081300 A1 | 4/2004 | Takae et al. |
| 2004/0098350 A1 | 5/2004 | Labrou et al. |
| 2004/0117189 A1 | 6/2004 | Bennett |
| 2004/0120280 A1 | 6/2004 | Western |
| 2004/0128359 A1 | 7/2004 | Horvitz et al. |
| 2004/0128539 A1 | 7/2004 | Shureih |
| 2004/0139400 A1 | 7/2004 | Allam et al. |
| 2004/0167822 A1 | 8/2004 | Chasen et al. |
| 2004/0205457 A1 | 10/2004 | Bent et al. |
| 2004/0210561 A1 | 10/2004 | Shen |
| 2004/0212941 A1 | 10/2004 | Haas et al. |
| 2004/0229194 A1 | 11/2004 | Yang |
| 2004/0237033 A1 | 11/2004 | Woolf et al. |
| 2004/0239703 A1 | 12/2004 | Angelica |
| 2004/0243613 A1 | 12/2004 | Pourheidari |
| 2004/0252692 A1 | 12/2004 | Shim et al. |
| 2004/0254013 A1 | 12/2004 | Quraishi et al. |
| 2004/0254917 A1 | 12/2004 | Brill et al. |
| 2004/0267552 A1 | 12/2004 | Gilliam et al. |
| 2004/0268253 A1 | 12/2004 | DeMello et al. |
| 2005/0021464 A1 | 1/2005 | Lindauer et al. |
| 2005/0022113 A1 | 1/2005 | Hanlon |
| 2005/0044148 A1 | 2/2005 | Son et al. |
| 2005/0044224 A1 | 2/2005 | Jun et al. |
| 2005/0066219 A1 | 3/2005 | Hoffman et al. |
| 2005/0069225 A1 | 3/2005 | Schneider et al. |
| 2005/0069849 A1 | 3/2005 | McKinney et al. |
| 2005/0076012 A1 | 4/2005 | Manber et al. |
| 2005/0088410 A1 | 4/2005 | Chaudhri |
| 2005/0091604 A1 | 4/2005 | Davis |
| 2005/0097007 A1 | 5/2005 | Alger et al. |
| 2005/0102618 A1 | 5/2005 | Naito |
| 2005/0125222 A1 | 6/2005 | Brown et al. |
| 2005/0132281 A1 | 6/2005 | Pan et al. |
| 2005/0138007 A1 | 6/2005 | Amitay |
| 2005/0144221 A1 | 6/2005 | Shin et al. |
| 2005/0144895 A1 | 7/2005 | Grimes et al. |
| 2005/0154601 A1 | 7/2005 | Halpern et al. |
| 2005/0176438 A1 | 8/2005 | Li |
| 2005/0177562 A1 | 8/2005 | Raciborski |
| 2005/0177567 A1 | 8/2005 | Hughes et al. |
| 2005/0193330 A1 | 9/2005 | Peters |
| 2005/0195975 A1 | 9/2005 | Kawakita |
| 2005/0198070 A1 | 9/2005 | Lowry |
| 2005/0222977 A1 | 10/2005 | Zhou et al. |
| 2005/0228836 A1 | 10/2005 | Bacastow et al. |
| 2005/0250439 A1 | 11/2005 | Leslie |
| 2005/0256822 A1 | 11/2005 | Hollingsworth |
| 2005/0257261 A1 | 11/2005 | Shraim et al. |
| 2005/0262258 A1 | 11/2005 | Kohno et al. |
| 2005/0286212 A1* | 12/2005 | Brignone ............... G06F 1/1632 |

(56) References Cited

U.S. PATENT DOCUMENTS

| | | | |
|---|---|---|---|
| 2005/0289394 A1 | 12/2005 | Arrouye et al. | 361/679.4 |
| 2006/0004840 A1 | 1/2006 | Senda | |
| 2006/0020469 A1 | 1/2006 | Rast | |
| 2006/0031316 A1 | 2/2006 | Forstadius | |
| 2006/0045470 A1 | 3/2006 | Poslinski et al. | |
| 2006/0047830 A1 | 3/2006 | Nair et al. | |
| 2006/0047844 A1 | 3/2006 | Deng | |
| 2006/0048184 A1 | 3/2006 | Poslinski et al. | |
| 2006/0053045 A1 | 3/2006 | Danielson et al. | |
| 2006/0057960 A1 | 3/2006 | Tran | |
| 2006/0061595 A1 | 3/2006 | Goede et al. | |
| 2006/0069697 A1 | 3/2006 | Shraim et al. | |
| 2006/0071754 A1 | 4/2006 | Tofts et al. | |
| 2006/0075205 A1 | 4/2006 | Martin et al. | |
| 2006/0075444 A1 | 4/2006 | Dillen | |
| 2006/0077897 A1 | 4/2006 | Kotzin | |
| 2006/0080261 A1 | 4/2006 | Christal | |
| 2006/0095404 A1 | 5/2006 | Adelman et al. | |
| 2006/0098900 A1 | 5/2006 | King et al. | |
| 2006/0101328 A1 | 5/2006 | Albornoz et al. | |
| 2006/0109242 A1 | 5/2006 | Simpkins | |
| 2006/0123053 A1 | 6/2006 | Scannell, Jr. | |
| 2006/0129618 A1 | 6/2006 | Maier | |
| 2006/0129924 A1 | 6/2006 | Nelson et al. | |
| 2006/0143558 A1 | 6/2006 | Albornoz et al. | |
| 2006/0145950 A1 | 7/2006 | Tanaka | |
| 2006/0156222 A1 | 7/2006 | Chi et al. | |
| 2006/0161635 A1 | 7/2006 | Lamkin et al. | |
| 2006/0175983 A1 | 8/2006 | Crouse et al. | |
| 2006/0179137 A1 | 8/2006 | Jennings, III et al. | |
| 2006/0190489 A1 | 8/2006 | Vohariwatt et al. | |
| 2006/0190568 A1 | 8/2006 | Patterson | |
| 2006/0195431 A1 | 8/2006 | Holzgrafe et al. | |
| 2006/0209175 A1 | 9/2006 | Cohen et al. | |
| 2006/0236240 A1 | 10/2006 | Lebow | |
| 2006/0240799 A1 | 10/2006 | Kim et al. | |
| 2006/0250994 A1 | 11/2006 | Sasaki et al. | |
| 2006/0253441 A1 | 11/2006 | Nelson | |
| 2006/0253458 A1 | 11/2006 | Dixon et al. | |
| 2006/0253461 A1 | 11/2006 | de Bonet | |
| 2006/0256083 A1 | 11/2006 | Rosenberg | |
| 2006/0265518 A1 | 11/2006 | Owens et al. | |
| 2006/0271629 A1 | 11/2006 | MacDowell | |
| 2006/0281058 A1 | 12/2006 | Mangoaela | |
| 2007/0005616 A1 | 1/2007 | Hay et al. | |
| 2007/0005757 A1 | 1/2007 | Finger et al. | |
| 2007/0014404 A1 | 1/2007 | Cha | |
| 2007/0016555 A1 | 1/2007 | Ito et al. | |
| 2007/0025704 A1 | 2/2007 | Tsukazaki et al. | |
| 2007/0039023 A1 | 2/2007 | Kataoka | |
| 2007/0050346 A1 | 3/2007 | Goel et al. | |
| 2007/0055926 A1 | 3/2007 | Christiansen et al. | |
| 2007/0061335 A1 | 3/2007 | Ramer et al. | |
| 2007/0061337 A1 | 3/2007 | Saito et al. | |
| 2007/0061803 A1 | 3/2007 | Barrett | |
| 2007/0073596 A1 | 3/2007 | Alexander et al. | |
| 2007/0078273 A1 | 4/2007 | Hirota | |
| 2007/0079236 A1 | 4/2007 | Schrier et al. | |
| 2007/0079383 A1 | 4/2007 | Gopalakrishnan | |
| 2007/0094285 A1 | 4/2007 | Agichtein et al. | |
| 2007/0094351 A1 | 4/2007 | Kalish et al. | |
| 2007/0105536 A1 | 5/2007 | Tingo, Jr. | |
| 2007/0112817 A1 | 5/2007 | Danninger | |
| 2007/0118533 A1 | 5/2007 | Ramer et al. | |
| 2007/0130109 A1 | 6/2007 | King et al. | |
| 2007/0136660 A1 | 6/2007 | Gurcan et al. | |
| 2007/0136679 A1 | 6/2007 | Yang | |
| 2007/0142934 A1 | 6/2007 | Boercsoek et al. | |
| 2007/0150456 A1 | 6/2007 | Lian et al. | |
| 2007/0162961 A1 | 7/2007 | Tarrance et al. | |
| 2007/0174545 A1 | 7/2007 | Okada et al. | |
| 2007/0185865 A1 | 8/2007 | Budzik et al. | |
| 2007/0189719 A1 | 8/2007 | Furumachi et al. | |
| 2007/0219983 A1 | 9/2007 | Fish | |
| 2007/0233562 A1 | 10/2007 | Lidwell et al. | |
| 2007/0233692 A1 | 10/2007 | Lisa et al. | |
| 2007/0234209 A1 | 10/2007 | Williams | |
| 2007/0238077 A1 | 10/2007 | Strachar | |
| 2007/0240187 A1 | 10/2007 | Beach et al. | |
| 2007/0242225 A1 | 10/2007 | Bragg et al. | |
| 2007/0250573 A1 | 10/2007 | Rothschild | |
| 2007/0282809 A1 | 12/2007 | Hoeber et al. | |
| 2007/0283173 A1 | 12/2007 | Webb et al. | |
| 2007/0288853 A1 | 12/2007 | Neil | |
| 2008/0005097 A1 | 1/2008 | Kleewein et al. | |
| 2008/0005203 A1 | 1/2008 | Bots et al. | |
| 2008/0005664 A1 | 1/2008 | Chandra | |
| 2008/0016064 A1 | 1/2008 | Sareday et al. | |
| 2008/0016164 A1 | 1/2008 | Chandra | |
| 2008/0027933 A1 | 1/2008 | Hussam | |
| 2008/0031595 A1 | 2/2008 | Cho | |
| 2008/0040233 A1 | 2/2008 | Wildman et al. | |
| 2008/0059702 A1 | 3/2008 | Lu et al. | |
| 2008/0066155 A1 | 3/2008 | Abraham | |
| 2008/0082518 A1 | 4/2008 | Loftesness | |
| 2008/0082911 A1 | 4/2008 | Sorotokin et al. | |
| 2008/0089665 A1 | 4/2008 | Thambiratnam et al. | |
| 2008/0113614 A1 | 5/2008 | Rosenblatt | |
| 2008/0115224 A1 | 5/2008 | Jogand-Coulomb et al. | |
| 2008/0120101 A1 | 5/2008 | Johnson et al. | |
| 2008/0120280 A1 | 5/2008 | Iijima et al. | |
| 2008/0133479 A1 | 6/2008 | Zelevinsky et al. | |
| 2008/0154908 A1 | 6/2008 | Datar et al. | |
| 2008/0163039 A1 | 7/2008 | Ryan et al. | |
| 2008/0164304 A1 | 7/2008 | Narasimhan et al. | |
| 2008/0165141 A1 | 7/2008 | Christie | |
| 2008/0168073 A1 | 7/2008 | Siegel et al. | |
| 2008/0208833 A1 | 8/2008 | Basmov | |
| 2008/0222552 A1 | 9/2008 | Batarseh et al. | |
| 2008/0231233 A1* | 9/2008 | Thornton | 320/137 |
| 2008/0235351 A1 | 9/2008 | Banga et al. | |
| 2008/0243788 A1 | 10/2008 | Reztlaff et al. | |
| 2008/0243814 A1 | 10/2008 | Gurcan et al. | |
| 2008/0243828 A1 | 10/2008 | Reztlaff et al. | |
| 2008/0259057 A1 | 10/2008 | Brons | |
| 2008/0270930 A1 | 10/2008 | Slosar | |
| 2008/0281058 A1 | 11/2008 | Araki | |
| 2008/0293450 A1 | 11/2008 | Ryan et al. | |
| 2008/0294674 A1 | 11/2008 | Reztlaff et al. | |
| 2008/0295039 A1 | 11/2008 | Nguyen et al. | |
| 2008/0298083 A1* | 12/2008 | Watson et al. | 362/603 |
| 2008/0301820 A1 | 12/2008 | Stevens | |
| 2009/0094528 A1 | 4/2009 | Gray et al. | |
| 2009/0094540 A1 | 4/2009 | Gray et al. | |
| 2009/0181649 A1 | 7/2009 | Bull et al. | |
| 2009/0228774 A1 | 9/2009 | Matheny et al. | |
| 2009/0231233 A1* | 9/2009 | Liberatore | G06F 1/1616 345/1.3 |
| 2009/0241054 A1 | 9/2009 | Hendricks | |
| 2009/0263777 A1 | 10/2009 | Kohn | |
| 2009/0267909 A1 | 10/2009 | Chen et al. | |
| 2009/0296331 A1* | 12/2009 | Choy | 361/679.09 |
| 2009/0319482 A1 | 12/2009 | Norlander et al. | |
| 2010/0023259 A1 | 1/2010 | Krumm et al. | |
| 2010/0081120 A1 | 4/2010 | Nanjiani et al. | |
| 2010/0095340 A1 | 4/2010 | Ei et al. | |
| 2010/0125876 A1 | 5/2010 | Craner et al. | |
| 2010/0131385 A1 | 5/2010 | Harrang et al. | |
| 2010/0164888 A1 | 7/2010 | Okumura et al. | |
| 2010/0177080 A1 | 7/2010 | Essinger et al. | |
| 2010/0188327 A1 | 7/2010 | Frid et al. | |
| 2010/0284036 A1 | 11/2010 | Ahn et al. | |
| 2010/0328223 A1 | 12/2010 | Mockarram-Dorri et al. | |
| 2011/0050591 A1 | 3/2011 | Kim et al. | |
| 2011/0050594 A1* | 3/2011 | Kim et al. | 345/173 |
| 2011/0057884 A1 | 3/2011 | Gormish et al. | |
| 2011/0069073 A1 | 3/2011 | Unger | |
| 2011/0112671 A1 | 5/2011 | Weinstein | |
| 2011/0191710 A1 | 8/2011 | Jang et al. | |
| 2011/0267333 A1 | 11/2011 | Sakamoto et al. | |
| 2011/0295926 A1 | 12/2011 | Battiston et al. | |
| 2012/0001923 A1* | 1/2012 | Weinzimmer | G06F 3/013 345/473 |

(56) References Cited

U.S. PATENT DOCUMENTS

| | | |
|---|---|---|
| 2012/0016774 A1 | 1/2012 | Dicke et al. |
| 2012/0036431 A1 | 2/2012 | Ito et al. |
| 2012/0041941 A1 | 2/2012 | King et al. |
| 2012/0079372 A1 | 3/2012 | Kandekar et al. |
| 2012/0197998 A1 | 8/2012 | Kessel et al. |
| 2012/0227001 A1 | 9/2012 | Gupta et al. |
| 2013/0219320 A1 | 8/2013 | Seet et al. |
| 2013/0246157 A1 | 9/2013 | Puppin et al. |
| 2014/0218286 A1 | 8/2014 | Kim |

FOREIGN PATENT DOCUMENTS

| | | |
|---|---|---|
| CN | 101120358 | 2/2008 |
| EP | 1197902 | 4/2002 |
| EP | 1842150 | 10/2007 |
| JP | 6274493 A | 9/1994 |
| JP | 07078139 | 3/1995 |
| JP | 09179870 | 7/1997 |
| JP | 10091640 | 4/1998 |
| JP | 11074882 | 3/1999 |
| JP | 2001052016 | 2/2001 |
| JP | 2001052025 | 2/2001 |
| JP | 2001100702 | 4/2001 |
| JP | 2001195412 | 7/2001 |
| JP | 2001236358 | 8/2001 |
| JP | 2002099739 | 4/2002 |
| JP | 2002197079 A | 7/2002 |
| JP | 2002259718 | 9/2002 |
| JP | 2002536736 | 10/2002 |
| JP | 2003016104 | 1/2003 |
| JP | 2003122969 | 4/2003 |
| JP | 2003513384 | 4/2003 |
| JP | 2003517158 | 5/2003 |
| JP | 2003186910 | 7/2003 |
| JP | 2005056041 | 3/2005 |
| JP | 2006011694 | 1/2006 |
| JP | 2006107496 | 4/2006 |
| JP | 2006129323 | 5/2006 |
| JP | 2006190114 | 7/2006 |
| JP | 2008071334 | 3/2008 |
| JP | 2008516297 | 5/2008 |
| JP | 2008527580 | 7/2008 |
| JP | 2008197634 | 8/2008 |
| KR | 1020020020262 | 3/2002 |
| WO | WO9720274 | 6/1997 |
| WO | WO0045588 | 8/2000 |
| WO | WO0056055 | 9/2000 |
| WO | WO0075840 | 12/2000 |
| WO | WO01/42978 | 6/2001 |
| WO | WO0239206 | 5/2002 |
| WO | WO2004055647 | 7/2004 |
| WO | WO2006078728 | 7/2006 |

OTHER PUBLICATIONS

Barnes & Noble, "Nook User Guide", retrieved from the Internet Feb. 5, 2013, 120 pgs.

"Kobo Wireless eReader & Desktop Application User Guide", Feb. 2011, 170 pgs.

Office Action for U.S. Appl. No. 13/070,328, mailed on Feb. 25, 2014, Sailesh Rachabathuni, "Last Screen Rendering for Electronic Book Readers", 11 pages.

Kindle Community, Discussions—Screen Saver, retrieved from the internet on Nov. 6, 2009 at <<http://www.amazon.com/tag/kindle/forum?cdForum=Fx1D7SY3BVSESG
&cdThread=Tx28QGUBE29L22J>>, 4 pages.

Non-Final Office Action for U.S. Appl. No. 12/567,984, mailed on Sep. 27, 2012, John T. Kim, "Last Screen Rendering for Electronic Book Reader", 9 pages.

Office action for U.S. Appl. No. 12/567,984, mailed on Mar. 15, 2013, Kim, "Last Screen Rendering for Electronic Book Readern", 10 pages.

Office action for U.S. Appl. No. 13/070,328, mailed on Jul. 25, 2013, Rachabathuni, "Last Screen Rendering for Electronic Book Readers," 11 pages.

U.S. Appl. No. 11/277,894, filed Mar. 29, 2006, Jateen P. Parekh, Gregg E. Zehr, and Subram Narasimhan,"Reader Device Content Indexing".

U.S. Appl. No. 11/537,518, filed Sep. 29, 2006, John Lattyak, "Acquisition of an Item based on a Catalog Presentation of Items."

U.S. Appl. No. 11/693,685, filed Mar. 29, 2007, John Lattyak; John Kim; Steven Moy; Laurent An Minh Nguyen, "Relative Progress and Event Indicators."

U.S. Appl. No. 11/763,314, filed Jun. 14, 2007, John Lattyak; Craig Griffin; Steven Weiss, "Display Dependent Markup Language."

U.S. Appl. No. 11/763,339, filed Jun. 14, 2007, David Isbister; Marshall Willilams; Nicholas Vaccaro, "Power Management Techniques for a User Device."

U.S. Appl. No. 11/763,357, filed Jun. 14, 2007, James Reztlaff II; John Lattyak, "Obtaining and Verifying Search Indices."

U.S. Appl. No. 11/763,363, filed Jun. 14, 2007, James Reztlaff II; Thomas Ryan, "Search Results Generation and Sorting."

U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."

U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."

U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."

U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."

U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin "Providing User-Supplied Items to a User Device."

U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System ."

U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin "Incremental Updates of Items ."

U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System ."

U.S. Appl. No. 11/963,618, filed Dec. 21, 2007, Michael Rykov; Laurent An Minh Nguyen; Steven Moy, "Dissemination of Periodical Samples."

U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."

U.S. Appl. No. 12/351,629, filed Jan. 9, 2009, John Johnston; Weiping Dou; Steven Chase, "Antenna Placement on Portable Device ."

U.S. Appl. No. 12/351,663, filed Jan. 9, 2009, Chris Li; Steven Chase, "Surface Mount Clip for Routing and Grounding Cables."

U.S. Appl. No. 12/360,089, filed Jan. 26, 2009, Thomas Dimson, Janna Hamaker, Eugene Kalenkovich, Tom Killalea, "Aggregation of Highlights."

(56) References Cited

OTHER PUBLICATIONS

U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."
U.S. Appl. No. 12/366,941, filed Feb. 6, 2009, Scott Dixon; Eriel Thomas, "Bundled Digital Content."
U.S. Appl. No. 12/414,914, filed Mar. 31, 2009, Amit Agarwal; Zaur Kambarov; Tom Killalea, "Questions on Highlighted Passages."
U.S. Appl. No. 29/331,528, filed Jan. 27, 2009, Chris Green, "User Interface Cluster."
Office Action for U.S. Appl. No. 13/722,961, mailed on Oct. 10, 2014, John Lattyak, "Delivery of Items for Consumption by a User Device", 8 pages.
Final Office Action for U.S. Appl. No. 11/763,392, mailed on Oct. 14, 2011, Thomas Ryan, "Administrative Tasks in a Media Consumption System", 38 pages.
Office action for U.S. Appl. No. 11/763,374 mailed on Oct. 16, 2012, Ryan et al, "Consumption of Items via a User Device", 13 pages.
Office action for U.S. Appl. No. 11/763,386, mailed on Oct. 16, 2013, Ryan et al., "Handling of Subscription-Related Issues in a Media Consumption System",18 pages.
Office action for U.S. Appl. No. 11/763,390, mailed on Oct. 24, 2011, Bajaj et al., "Providing User-Supplied Items to a User Device", 11 pages.
Final Office Action for U.S. Appl. No. 13/284,446, mailed on Oct. 31, 2014, Linsey R. Hansen, "Indicators for Navigating Digital Works", 17 pages.
Office action for U.S. Appl. No. 13/083,445, mailed on Oct. 5, 2012, Siegel et al., "Method and System for Providing Annotations of a Digital Work", 29 pages.
Office Action from the U.S. Patent and Trademark Office for U.S. Appl. No. 11/763,378, mailed on Oct. 6, 2014, Lattyak et al., "Transfer of Instructions to a User Device", 16 pgs.
Office Action for U.S. Appl. No. 11/693,682, mailed on Oct. 7, 2014, Siegel et al., "Providing Annotations of a Digital Work", 12 pages.
Office Action for U.S. Appl. No. 12/943,211, mailed on Oct. 8, 2013, "Obtaining and Verifying Search Indices", 9 pages.
Final Office Action for U.S. Appl. No. 12/759,828, mailed on Nov. 10, 2011, James R. Retzalff II, "Search and Indexing on a User Device", 16 pages.
Office action for U.S. Appl. No. 12/360,089, mailed on Nov. 23, 2012, Killalea et al., "Aggregation of Highlights", 15 pages.
Final Office Action for U.S. Appl. No. 11/537,518, mailed on Nov. 25, 2011, John Lattyak, "Acquisition of an Item Based on a Catalog Presentation of Items," 8 pages.
Final Office Action for U.S. Appl. No. 13/959,589, mailed on Nov. 6, 2014, Thomas A. Ryan, "Administrative Tasks in a Media Consumption System", 29 pages.
Non-Final Office Action for U.S. Appl. No. 11/763,386, mailed on Nov. 8, 2011, Thomas Ryan, "Handling of Subscription-Related Issues in a Media Consumption System", 10 pages.
Non-Final Office Action, dated Nov. 9, 2011, for U.S. Appl. No. 11/763,395, Thomas Ryan, "Providing Supplemental Information Based on Hints in a Media Consumption System", 10 pages.
Office Action for U.S. Appl. No. 12/759,828, mailed on Dec. 17, 2013, James R. Retzlaff II, "Search and Indexing on a User Device", 25 pages.
Office action for U.S. Appl. No. 11/763,357 , mailed on Dec. 21, 2011, Reztlaff et al., "Obtaining and Verifying Search Indices", 14 pages.
Final Office Action for U.S. Appl. No. 11/763,363, mailed on Dec. 23, 2011, James R. Rezlaff II et al., "Search Results Generation and Sorting", 10 pages.
Office Action for U.S. Appl. No. 11/763,374, mailed on Dec. 24, 2013, Thomas A. Ryan, "Consumption of Items via a User Device", 16 pages.

Non-Final Office Action for U.S. Appl. No. 11/763,369, mailed on Dec. 29, 2011, James R. Reztlaff II et al., "Search of Multiple Content Sources on a User Device", 21 pages.
Final Office Action for U.S. Appl. No. 11/693,685, dated Dec. 8, 2011, John Lattyak et al., "Relative Progress and Event Indicators", 23 pages.
Final Office Action for U.S. Appl. No. 11/763,374, mailed on Feb. 13, 2012, Thomas Ryan et al., "Consumption of Items via a User Device", 14 pages.
Office action for U.S. Appl. No. 11/763,392, mailed on Feb. 14, 2013, Ryan et al., "Administrative Tasks in a Media Consumption System", 47 pages.
Office Action for U.S. Appl. No. 11/537,518, mailed on Feb. 14, 2014, John Lattyak, "Acquisition of an Item Based on a Catalog Presentation of Items", 14 pages.
Non-Final Office Action for U.S. Appl. No. 11/763,393, mailed on Feb. 16, 2012, John Lattyak et al., "Incremental Updates of Items", 24 pages.
Office action for U.S. Appl. No. 13/294,803, mailed on Feb. 21, 2013, Inventor #1, "Progress Indication Fora Digital Work", 76 pages.
Office action for U.S. Appl. No. 11/763,386, mailed on Feb. 28, 2013, Ryan et al., "Handling of Subscription-Related Issues in a Media Consumption System ", 17 pages.
Office Action for U.S. Appl. No. 11/763,314, mailed on Mar. 10, 2014, Craig S. Griffin, "Display Dependent Markup Language", 42 pages.
Office action for U.S. Appl. No. 12/366,941, mailed on Mar. 14, 2014, Dixon et al., "Bundled Digital Content", 13 pages.
Final Office Action for U.S. Appl. No. 11/693,685, mailed on Mar. 24, 2014, John Lattyak, "Relative Progress and Event Indicators", 26 pages.
Office Action for U.S. Appl. No. 11/763,357, mailed on Mar. 27, 2014, James R. Retzlaff II, "Obtaining and Verifying Search Indices", 14 pages.
Final; Office Action for U.S. Appl. No. 12/360,089, mailed on Mar. 28, 2012, Tom Killalea et al., "Aggregation of Highlights", 17 pages.
Non-Final Office Action for U.S. Appl. No. 12/366,941, mailed on Mar. 30, 2012, Scott Dixon et al., "Bundled Digital Content", 12 pages.
Office action for U.S. Appl. No. 12/360,089, mailed on Mar. 5, 2013, Killalea et al., "Aggregation of Highlights", 17 pages.
Office action for U.S. Appl. No. 11/763,374, mailed on Apr. 22, 2013, Ryan et al., "Consumption of Items via a User Device", 17 pages.
Office action for U.S. Appl. No. 11/693,682, mailed on Apr. 23, 2012, Siegel et al., "Providing Annotations of a Digital Work", 12 pages.
Office Action for U.S. Appl. No. 13/722,961, mailed on Apr. 25, 2014, John Lattyak, "Delivery of Items for Consumption by a User Device", 4 pages.
Final Office Action for U.S. Appl. No. 11/763,386, mailed on Apr. 26, 2012, Thomas Ryan et al., "Handling of Subscription-Related Issues in a Media Consumption System", 14 pages.
Non-Final Office Action for U.S. Appl. No. 11/537,518, mailed on Apr. 28, 2011, John Lattyak, "Acquisition of an Item Based on a Catalog Presentation of Items", 8 pages.
Office action for U.S. Appl. No. 11/763,390, mailed on Apr. 8, 2013, Bajaj et al, "Providing User-Supplied Items to a User Device ", 7 pages.
Office action for U.S. Appl. No. 11/763,369, mailed on May 14, 2013, Reztlaff, II et al., "Search of Multiple Content Sources on a User Device", 24 pages
Final Office Action for U.S. Appl. No. 11/763,374, mailed on May 14, 2014, Thomas A. Ryan, "Consumption of Items via a User Device", 21 pages.
Office action for U.S. Appl. No. 11/763,395, mailed on May 2, 2013,Ryan et al., "Providing Supplemental Information Based on Hints in a Media Consumption System ", 12 pages.
Final Office Action for U.S. Appl. No. 12/759,828, mailed on May 2, 2014, James R. Retzlaff II, "Search and Indexing on a User Device", 27 pages.

(56) References Cited

OTHER PUBLICATIONS

Office action for U.S. Appl. No. 11/763,357, mailed on May 26, 2011, Reztlaff, "Obtaining and Verifying Search Indices", 13 pages.
Non-Final Office Action for U.S. Appl. No. 13/083,445, mailed on May 4, 2012, Hilliard B. Siegel et al., "Method and System for Providing Annotations of a Digital Work", 20 pages.
Final Office Action for U.S. Appl. No. 11/763,395, mailed May 9, 2012, Thomas Ryan et al., "Providing Supplemental Information Based on Hints in a Media Consumption System", 12 pages.
Final Office Action for U.S. Appl. No. 11/763,314, mailed on Jun. 13, 2011, Craig S. Griffin, "Display Dependent Markup Language", 26 pages.
The European Office Action mailed Sep. 23, 2014 for European patent application No. 08732668.2, a counterpart foreign application of U.S. Appl. No. 11/763,369, 7 pages.
The European Office Action mailed Nov. 27, 2014 for European patent application No. 06718773.2, a counterpart foreign application of U.S. Pat. No. 8,131,647, 31 pages.
The European Office Action mailed Mar. 26, 20010 for European Patent Application No. 06718773.2, a counterpart foreign application of U.S. Appl. No. 11/039,645, 1 page.
The European Office Action mailed Apr. 7, 2014 for European patent application No. 06718773.2, a counterpart foreign application of U.S. Pat. No. 8,131,647, 7 pages.
The European Office Action mailed Jun. 10, 2013 for European patent application No. 06718773.2, a counterpart foreign application of U.S. Appl. No. 11/693,682, 6 pages.
The European Search report mailed Dec. 22, 2009 for European Patent Application No. 06718773.2, a counterpart foreign application of U.S. Appl. No. 11/039,645, 9 pageC.
Office Action from the U.S. Patent and Trademark Office for U.S. Appl. No. 11/763,375, mailed Feb. 23, 2010, 15 pages.
Final Office Action from the U.S. Patent and Trademark Office for U.S. Appl. No. 11/763,378, mailed on Mar. 16, 2010, 16 pgs.
Final Office Action for U.S. Appl. No. 11/763,358, mailed on Apr. 5, 2011, James R. Retzlaff II, "Managing Status of Search Index Generation", 15 pages.
Final Office Action from the U.S. Patent and Trademark Office for U.S. Appl. No. 12/414,914, mailed on Jan. 4, 2012, 16 pgs.
Final Office Action for U.S. Appl. No. 12/360,089, mailed on Jan. 28, 2014, Tom Killalea, "Aggregation of Highlights", 14 pages.
Final Office Action for U.S. Appl. No. 11/763,395, mailed on Oct. 30, 2013, Thomas A. Ryan, "Providing Supplemental Information Based on Hints in a Media Consumption System", 14 pages.
Final Office Action for U.S. Appl. No. 12/414,914, mailed on Feb. 10, 2014, Amit D. Agarwal, "Questions on Highlighted Passages", 40 pages.
Gladney, H. M.: "Access Control for Large Collections", ACM Transactions on Information Systems, vol. 15, No. 2, Apr. 1997, pp. 154-194.
Goodreads.com, "About goodreads", 2006, 2 pages.
Malloy, et al., "Google Search", Retrieved on at <<http://en.wikipedia.org/w/index.php?title=Google_Search&oldid=118323867>>, Wikipedia, the free encyclopedia, Mar. 2007, 6 pages.
"Haptic History—Machine Haptics (Expansion)" retrieved on May 7, 2009 at <<http://hapticshistory.chc61.uci.cu/haptic/site/pages/Machine-Haptics-Became_5.php. from Google's cache, text-only version as webpage appeared on Apr. 16, 2009, 8 pgs.
Henke, H. "Survey on Electronic Book Features", Open eBook Forum, online, Mar. 20, 2002, pp. 1-14, retrieved from the internet: <http://www.openebook.org/doc_library/surveys/IDPF_eBook_Features_2002.pdf> retrieved Nov. 8, 2010.
Homer, et al., "Instant HTML", Wrox Press, 2nd Edition, updated Jun. 1998, 7 pages.
Jones, et al., "Development of a Tactile Vest", IEEE Computer Society, in the Proceedings of the 12th International Symposium on Haptic Interfaces for Virtual Environment and Teleoperator Systems, Mar. 27-28, 2004, pp. 82-89.

Translated Copy of the Japanese Office Action mailed Sep. 2, 2014 for Japanese patent application No. 2011-548210, a counterpart foreign application of U.S. Appl. No. 12/360,744, 4 pages.
Translated copy of the Japanese Office Action mailed Jan. 14, 2014 for Japanese patent application No. 2011-548210, a counterpart foreign application of U.S. Pat. No. 8,378,979, 4 pages.
Translated copy of the Japanese Office Action mailed Jan. 25, 2011 for Japanese Patent Application No. 2007-552235, a counterpart foreign application of U.S. Appl. No. 11/039,645, 6 pages.
Translated copy of the Japanese Office Action mailed Oct. 12, 2012 for Japanese patent application No. 2009-544304, a counterpart foreign application of U.S. Pat. No. 7,865,817, 6 pages.
Translated copy of the Japanese Office Action mailed Oct. 25, 2011 for Japanese patent application No. 2007-552235, a counterpart foreign application of U.S. Appl. No. 11/039,645, 5 pages.
Translated copy of the Japanese Office Action mailed Nov. 12, 2013 for Japanese patent application No. 2010-501125, a counterpart foreign application of U.S. Appl. No. 11/763,369, 9 pages.
Translated Copy of the Japanese Office Action mailed Dec. 16, 2014 for Japanese patent application No. 2009-544304, a counterpart foreign application of U.S. Appl. No. 11/693,677, 2 pages.
Translated copy of the Japanese Office Action mailed Dec. 17, 2012 for Japanese patent application No. 2010-509529, a counterpart foreign application of U.S. Appl. No. 11/763,374, 7 pages.
Translated copy of the Japanese Office Action mailed Dec. 7, 2012 for Japanese patent application No. 2010-501124, a counterpart foreign application of U.S. Appl. No. 11/693,682, 6 pages.
Translated copy of the Japanese Office Action mailed Apr. 12, 2013 for Japanese patent application No. 2010-501125, a counterpart foreign application of U.S. Appl. No. 11/763,369, 5 pages.
Translated copy of the Japanese Office Action mailed May 24, 2013 for Japanese patent application No. 2010-501124, a counterpart foreign application of U.S. Appl. No. 111693,682, 7 pages.
Translated copy of the Japanese Office Action mailed May 31, 2013 for Japanese patent application No. 2010-509529, a counterpart foreign application of U.S. Appl. No. 11/763,374, 5 pages.
Translated copy of the Japanese Office Action mailed Aug. 23, 2013 for Japanese patent application No. 2009-544304, a counterpart foreign application of U.S. Pat. No. 7,865,817, 4 pages.
Translated copy of the Japanese Office Action mailed Aug. 5, 2014 for Japanese patent application No. 2010-501125, a counterpart foreign application of U.S. Appl. No. 11/763,369, 7 pages.
Translated copy of the Japanese Office Action mailed Sep. 18, 2012 for Japanese patent application No. 2007-552235, a counterpart foreign application of U.S. Pat. No. 8,131,647, 4 pages.
Translated copy of the Korean Office Action mailed Dec. 19, 2014 for Korean patent application No. 10-2009-7024280, a counterpart foreign application of U.S. Appl. No. 11/763,374, 10 pages.
Leach et al, "A Universally Unique IDentifier (UUID) URN Namespace", IETF, Retrieved at <<http://tools.ietf.org/pdf/rfc4122.pdf>>, Jul. 2005, 32 pgs.
Means, et al., "Evaluating Compliance with FCC Guidelines for Human Exposure to Radiofrequency Electromagnetic Fields", OET Bulletin 65 Edition 97-01, Jun. 2001, 57 pages.
Mercier et al., "Sphere of influence Model in Information retrieval", IEEE 2005 International Conference on Fuzzy Systems, May 2005, pp. 120-125.
Navarro, et al., "Modern Information Retrieval, Chapter 8: Indexing and Searching", Modern Information Retrieval, ACM Press, Jan. 1999, pp. 191-228.
Office Action from the U.S. Patent and Trademark Office for U.S. Appl. No. 11/763,375, mailed on Jan. 19, 2010, 31 pgs.
Office Action from the U.S. Patent and Trademark Office for U.S. Appl. No. 11/763,378, mailed on Oct. 15, 2009, 31 pgs.
Office Action from the U.S. Patent and Trademark Office for U.S. Appl. No. 11/763,375, mailed on Aug. 6, 2010, 17 pgs.
Office Action for U.S. Appl. No. 12/366,941, mailed on Jan. 6, 2015, Scott Dixon, "Bundled Digital Content", 15 pages.
Final Office Action for U.S. Appl. No. 11/537,518, mailed on Jan. 9, 2015, John Lattyak, "Acquisition of an Item Based on a Catalog Presentation of Items", 13 pages.
Office action for U.S. Appl. No. 12/943,211, mailed on Feb. 6, 2013, Reztlaff, II et al., "Obtaining and Verifying Search Indices", 9 pages.

(56) References Cited

OTHER PUBLICATIONS

Final Office Action for U.S. Appl. No. 11/537,484, mailed on Jan. 24, 2012, Thomas A. Ryan, "Expedited Acquisition of a Digital Item Following a Sample Presentation of the Item", 22 pages.
Final Office Action for U.S. Appl. No. 12/414,914, mailed on Jan. 4, 2012, Agarwal et al., "Questions on Highlighted Passages", 41 pages.
Office action for U.S. Appl. No. 12/360,089, mailed on Oct. 5, 2011, Killalea et al., "Aggregation of Highlights", 75 pages.
Office Action for U.S. Appl. No. 13/959,589, mailed on Jun. 2, 2014, Thomas A. Ryan, "Administrative Tasks in a Media Consumption System", 24 pages.
Office action for U.S. Appl. No. 13/284,446, mailed on Jun. 24, 2014, Hansen, "Indicators for Navigating Digital Works", 19 pages.
Office action for U.S. Appl. No. 11/763,390, mailed on Jun. 27, 2012, Bajaj et al., "Providing User-Supplied Items to a User Device", 7 pages.
Office action for U.S. Appl. No. 11/763,392, mailed on Jun. 27, 2012, Ryan et al., "Administrative Tasks in a Media Consumption System ", 47 pages.
Office action for U.S. Appl. No. 13/294,803, mailed on Jun. 4, 2013, Lattyak et al., "Progress Indication for a Digital Work", 26 pages.
Office Action for U.S. Appl. No. 12/949,115, mailed on Jun. 4, 2014, Thomas A. Ryan, "Invariant Referencing in Digital Works", 11 pages.
Non-Final Office Action for U.S. Appl. No. 12/943,211, mailed on Jun. 6, 2012, James. R. Retzlaff II et al., "Obtaining and Verifying Search Indices", 10 pages.
Office action for U.S. Appl. No. 12/759,828, mailed on Jun. 6, 2013, Reztlaff, II et al., "Search and Indexing on a User Device", 27 pages.
Non-Final Office Action for U.S. Appl. No. 11/763,369 mailed on Jun. 7, 2012, James R. Reztlaff II et al., "Search of Multiple Content Sources on a User Device", 20 pages.
Non-Final Office Action for U.S. Appl. No. 11/693,682, mailed on Jun. 9, 2011, Hilliard B. Siegel, "Providing Annotations of a Digital Work", 12 pages.
Office action for U.S. Appl. No. 12/333,215, mailed on Jul. 18, 2011, Zagorie et al., "Device-Specific Presentation Control for Electronic Book Reader Devices", 22 pages.
Office action for U.S. Appl. No. 12/943,211, mailed on Jul. 2, 2014, Retzlaff, II et al., "Obtaining and Verifying Search Indices", 9 pages.
Office action for U.S. Appl. No. 12/360,089, mailed on Jul. 3, 2013, Killalea et al., "Aggregation of Highlights", 14 pages.
Non-Final Office Action for U.S. Appl. No. 11/693,685, mailed Jul. 6, 2011, John Lattyak, "Relative Progress and Event Indicators", 22 pages.
Office action for U.S. Appl. No. 12/414,914, mailed on Aug. 4, 2011, Agarwal et al., "Questions on Highlighted Passages", 39 pages.
Office action for U.S. Appl. No. 11/693,685, mailed on Aug. 15, 2013, Lattyak et al., "Relative Progress and Event Indicators", 24 pages.
Office action for U.S. Appl. No. 11/763,376, mailed on Aug. 19, 2013, Kiraly et al., "Notification of a User Device to Perform an Action", 16 pages.
Non-final Office Action for U.S. Appl. No. 11/537,484, mailed on Aug. 19, 2011, Thomas A. Ryan, "Expedited Acquisition of a Digital Item Following a Sample Presentation of the Item", 13 pages.
Non-final Office Action for U.S. Appl. No. 11/763,363, mailed on Aug. 26, 2011, James R. Rezlaff II, "Search Results Generation and Sorting", 10 pages.
Office action for U.S. Appl. No. 11/537,484, mailed on Aug. 27, 2013, Ryan, "Expedited Acquisition of a Digital Item Following a Sample Presentation of the Item", 13 pages.
Office action for U.S. Appl. No. 11/763,314, mailed on Aug. 28, 2014, Griffin et al., "Display Dependent Markup Language", 52 pages.
Non-Final Office Action for U.S. Appl. No. 11/763,358, mailed on Sep. 12, 2011, James R. Retzlaff II, "Managing Status of Search Index Generation", 11 pages.
Office action for U.S. Appl. No. 12/414,914, mailed on Sep. 13, 2013, Agarwal et al, "Questions on Highlighted Passages", 35 pages.
Final Office Action for U.S. Appl. No. 11/763,369, mailed on Sep. 16, 2013, James R. Reztlaff II et al., "Search of Multiple Content Sources on a User Device", 23 pages.
Office Action for U.S. Appl. No. 13/294,803, mailed on Sep. 24, 2013, John Lattyak, "Progress Indication for a Digital Work", 27 pages.
Office action for U.S. Appl. No. 13/083,445, mailed on Sep. 24, 2014, Siegel et al., "Method and System for Providing Annotations of a Digital Work", 31 pages.
Final Office Action for U.S. Appl. No. 11/963,618, mailed on Sep. 26, 2011, Michael Rykov, "Dissemination of Periodical Samples", 15 pages.
Non-Final Office Action for U.S. Appl. No. 11/763,374, mailed on Sep. 27, 2011, Thomas Ryan, "Consumption of Items via a User Device", 17 pages.
Office action for U.S. Appl. No. 11/537,518, mailed on Sep. 4, 2014, Lattyak, "Acquisition of an Item Based on a Catalog Presentation of Items", 10 pages.
Office action for U.S. Appl. No. 13/722,961, mailed on Sep. 5, 2013, Lattyak et al., "Delivery of Items for Consumption by a User Device ", 6 pages.
Oki et al., "The Infomation Bus-An Architecture for Extensive Distributed Systems", ACM SIGOPS, May 1993, 11 pages.
Oqo "A Full PC That Fits in Your Pocket" Retrieved on Sep. 22, 2008 at <<http://www.oqo.com/support/documentation.html>>, 34 pages.
Palm Reader Handbook, Palm Inc., 2000, 56 pages.
International Search Report mailed Sep. 9, 2008, in International Application No. PCT/US/08/64387, filed May 21, 2008, 1 page.
International Search Report mailed Aug. 15, 2008, in International Application No. PCT/US07/89105, filed Dec. 28, 2007, 2 pages.
International Search Report mailed Aug. 15, 2008, in corresponding International Application No. PCT/US08/57829, filed Mar. 21, 2008, 1 page.
International Search Report mailed Jul. 7, 2008, in International Application No. PCT/US08/57848, filed Mar. 31, 2008, 2 pages.
PCT International Search Report and the Written Opinion for Application No. PCT/US 08/64389, mailed on Jan. 28, 2009, 7 pgs.
PCT Search Report for PCT Application No. PCT/US10/22060, mailed Mar. 8, 2010, 7 pages.
PCT International Search Report and the Written Opinion for Application No. PCT/US2006/001752, mailed on Jul. 27, 2006, 8 pgs.
Sohn et al. "Development of a Standard Format for eBooks", SAC2002, Mar. 2002, 6 pages.
"The Berkman Center for Internet & Society at Harvard Law School: Annotation Engine," Harvard.Edu, 1999-2004, Retrieved on Jan. 30, 2004, from <<http://cyber.iaw.harvard.eduJprojects/annotate.html>>, 3 pages.
Marshall, C.C., "The Future of Annotation in a Digital (Paper) World," Proceedings o/the 35th Annual GSLIS Clinic, Mar. 24, 1998, 19 pages.
"Universal Unique Identifier", The Open Group, Retrieved via Wayback Machine at <<http://web.archive.org/web/20021216070918/http://www.opengroup.org/onlinepubs/9629399/apdxa.htm>>, Dec. 16, 2002, 9 pages.
"Web Services Architecture: W3C Working Group Note Feb. 11, 2004", W3C, Feb. 11, 2004, 100 pages.
Wellman, et al., "Mechanical Design and Control of a High-Bandwidth Shape Memory Alloy Tactile Display", Springer-Verlag, In the Proceedings of the International Symposium on Experimental Robotics, Jun. 1997, 12 pgs.
Ziviani, N Ed, Baeza-Yates R. et at: "Modern Information Retrieval, Text Operations", Modern Information Retrieval, Jan. 1, 1999, pp. 163-190.
Zobel, J. et al., "Inverted Files for Text Search Engines" ACM Computing Surveys, vol. 38, No. 2, Jul. 1, 2006, pp. 1-56.

(56) References Cited

OTHER PUBLICATIONS

"Annotation Engine," Berkman Center for Internet & Society at Harvard Law School, Retrieved on Jan. 30, 2004 from <<http://cyber.law.harvard.edulproj ectsl annotate.html>>, 3 pages.
"Annotator Instructions," Berkman Center for Internet & Society at Harvard Law School, Retreived Mar. 30, 2011 from <<http://cyber.law.harvard.edu/annotate/instructions.html>>, 1 page.
"Annotator Wishlist," Berkman Center for Internet & Society at Harvard Law School, Retrieved Jan. 30, 2004, from <<http://cyber.law.harvard.edulcite/annotate.cgi ?action=print&markup ;center=; view=http%3A%2F%2Fcy . . . >>, 1 page.
BarnesandNoble.com, "Barnes and Noble Homepage", Retrieved from <<http://web.archive.org/web/19981202183957/http://www.barnesandnoble.com/>>, Dec. 2, 1998, 2 pages.
Beigbeder et al., "An Information Retrieval Model Using the Fuzzy Proximity Degree of Term Occurences", 2005 ACM Symposium on Applied Computing, Mar. 2005, pp. 1018-1022.
Bellwood, et al., "UDDI Version 2.04 API Specification UDDI Committee Specification, Jul. 19, 2002", Oasis, Retrieved at <<http://web.archive.org/web/20050314033213/www.oasis-open.org/committees/uddi-spec/doc/tcspecs.htm>>, 95 pages.
Roscheisen, M., et al., "Beyond Browsing: Shared Comments, SOAPs, Trails, and On-Line Communities," Computer Networks and ISDN Systems, Proceedings of the Third International WWW Conference, Apr. 1995, 12 pages.
Biskup, J., et al, "Towards a Credential-Based Implementation of Compound Access Control Policies" SACMAT '04, Proceedings of the ninth ACM symposium on Access control models and technologies, Jun. 4, 2004, pp. 31-40.
Bradley, "Plastic Shape Shifter", Chemistry WebMagazine, Issue No. 61, Dec. 2006, 2 pgs.
Breu, M. et al., "The Medoc Distrubuted Electronic Library: Accounting and Security Aspects", Electronic Publishing, New Models and Opportunities, Proceedings of an ICCC/IFIP Conference, Apr. 14, 1997, pp. 237-249.
The Canadian Office Action mailed Dec. 15, 2014 for Canadian patent application No. 2681754, a counterpart foreign application of U.S. Appl. No. 11/763,369, 5 pages.
Canadian Office Action mailed Apr. 14, 2009 for Canadian Patent Application No. 2594573, a counterpart foreign application of U.S. Appl. No. 11/039,645.
The Canadian Office Action mailed May 29, 2014 for Canadian patent application No. 2684580, a counterpart foreign application of U.S. Appl. No. 11/763,374, 3 pages.
Canadian Office Action mailed Jul. 6, 2012 for Canadian patent application No. 2594573, a counterpart foreign application of U.S. Appl. No. 8,131,647, 5 pages.
The Canadian Office Action mailed Aug. 14, 2014 for Canadian patent application No. 2684955, a counterpart foreign application of U.S. Appl. No. 11/693,682, 3 pages.
Cafesoft.com, "Security Glossary", Retrieved from <<http://web.archive.org/web/20031013022218/http://cafesoft.com/support/security-glossary.html>>, Oct. 13, 2003, 5 pages.
Card et al., "3Book: A 3D Electronic Smart Book", AVI'04, May 25-28, 2004, pp. 303-307.
Cavanaugh, "EBooks and Accommodations", Teaching Exceptional Children, vol. 35, No. 2, Nov. / Dec. 2002, 6 pages.
Chi et al. "eBooks with Indexes that Reorganize Conceptually", CHI2004, Apr. 24-29, 2004, pp. 1223-1226.
Cleveland, Jr. et al., "Questions and Answers about Biological Effects and Potential Hazards of Radiofrequency Electromagnetic Fields" OET Bulletin 56, Fourth Edition, Aug. 1999, 38 pages.
Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.
Translated copy of the Chinese Office Action mailed May 9, 2008 for Chinese Patent Application No. 200680002606.2, a counterpart foreign application of U.S. Appl. No. 11/039,645, 48 pages.

Translated copy of the Chinese Second Office Action mailed Jun. 5, 2009 for Chinese Patent Application No. 2006800026062, a counterpart foreign application of U.S. Appl. No. 11/039,645, 20 pages.
Translated copy of the Chinese Third Office Action mailed Nov. 27, 2009 for Chinese Patent Application No. 2006800026062, a counterpart foreign application of U.S. Appl. No. 11/039,645, 23 pages.
Translated Copy of the Chinese Office Action mailed Feb. 25, 2014 for Chinese patent application No. 200880025056.5 , a counterpart foreign application of U.S. Appl. No. 11/763,374, 13 pages.
Translated copy of the Chinese Office Action mailed Jan. 6, 2014 for Chinese patent application No. 201080006308.7, a counterpart foreign application of U.S. Pat. No. 8,378,979, 12 pages.
Translated copy of the Chinese Office Action mailed Oct. 10, 2011 for Chinese patent application No. 200880017259.X, a counterpart foreign application of U.S. Appl. No. 11/693,682, 12 pages.
Translated copy of the Chinese Office Action mailed Nov. 5, 2013 for Chinese patent application No. 200880025056.5, a counterpart foreign application of U.S. Appl. No. 11/763,374, 15 pages.
Translated copy of the Chinese Office Action mailed Dec. 13, 2012 for Chinese patent application No. 20078004873.9, a counterpart foreign application of U.S. Pat. No. 7,865,817, 4 pages.
Translated copy of the Chinese Office Action mailed Dec. 14, 2012 for Chinese patent application No. 200880017589.9, a counterpart foreign application of U.S. Appl. No. 11/763,369, 8 pages.
Translated copy of the Chinese Office Aciton mailed Feb. 1, 2013 for Chinese patent application No. 200880025056.5, a counterpart foreign application of U.S. Appl. No. 11/763,374, 19 pages.
Translated copy of the Chinese Office Action mailed May 17, 2012 for Chinese patent application No. 20078004873.9, a counterpart foreign application of U.S. Pat. No. 7,865,817, 5 pages.
Translated copy of the Chinese Office Action mailed May 21, 2012 for Chinese patent application No. 200880017589.9, a counterpart foreign application of U.S. Appl. No. 11/763,369, 19 pages.
Translated copy of the Chinese Office Action mailed Jun. 16, 2014 for Chinese patent application No. 200880025056.5, a counterpart foreign application of U.S. Appl. No. 11/763,374, 18 pages.
The Chinese Office Action mailed Jun. 28, 2013 for Chinese patent application No. 20078004873.9, a counterpart foreign application of U.S. Appl. No. 7,865,817, 4 pages.
The Chinese Office Action mailed Jun. 5, 2014 for Chinese patent application No. 201080006308.7, a counterpart foreign application of U.S. Pat. No. 8,378,979, 9 pages.
Translated copy of the Chinese Office Action mailed Jun. 6, 2013 for Chinese patent application No. 201080006308.7, a counterpart foreign application of U.S. Pat. No. 8,378,979, 13 pages.
Translated copy of the Chinese Office Action mailed Jul. 10, 2013 for Chinese patent application No. 200880025056.5, a counterpart foreign application of U.S. Appl. No. 11/763,374, 8 pages.
Translated copy of the Chinese Office Action mailed Jul. 14, 2011 for Japanese patent application No. 20078004873.9, a counterpart foreign application of U.S. Pat. No. 7,865,817, 6 pages.
Translated copy of Chinese Office Action mailed Aug. 25, 2011 for Chinese patent application No. 200880024964.2, a counterpart foreign application of U.S. Appl. No. 11/763,358, 10 pages.
Translated copy of the Chinese Office Action mailed Aug. 3, 2012 for Chinese patent application No. 200880025056.5, a counterpart foreign application of U.S. Appl. No. 11/763,374, 17 pages.
Translated copy of the Chinese Office Action mailed Sep. 24, 2012 for Chinese patent application No. 200880017259.X, a counterpart foreign application of U.S. Appl. No. 11/693,682, 5 pages.
Translated copy of the Chinese Office Action mailed Sep. 26, 2011 for Chinese patent application No. 200880017589.9, a counterpart foreign application of U.S. Appl. No. 11/763,369, 9 pages.
Translated copy of the Chinese Office Action mailed Sep. 30, 2011 for Chinese patent application No. 200880025056.5, a counterpart foreign application of U.S. Appl. No. 11/763,374, 9 pages.
Davison et al. "The Use of eBooks and Interactive Multimedia, as Alternative Forms of Technical Documentation" SIGDOC'05, Sep. 21-23, 2005, pp. 108-115.
Desmoulins et al., "Pattern-Based Annotations on E-books: From Personal to Shared Didactic Content", Proceedings of the IEEE International Workshop on Wireless and Mobile Techniques in Education, 2002, 4 pages.

(56) References Cited

OTHER PUBLICATIONS

Carter, S., et al., "Digital Graffiti: Public Annotation of Multimedia Content", Proceedings of CHI2004, Apr. 24-29, 2004, pp. 1207-1210.

Elspass, et al., "Portable Haptic Interface with Active Functional Design", In Proceedings SPIE Conference on Smart Structures and Integrated Systems, Newport Beach, California, vol. 3668, Mar. 1999, pp. 926-932.

The Mintues of the Oral Proceedings mailed on Nov. 27, 2014 for European patent application No. 06718773.2, a counterpart foreign application of U.S. Pat. No. 8,131,647, 13 pages.

Office action for U.S. Appl. No. 14/246,999, mailed Nov. 30, 2015, Kim, "Last Screen Rendering for Electronic Book Reader", 9 pages.

Office action for U.S. Appl. No. 14/246,999, mailed on Jul. 2, 2015, Kim "Last Screen Rendering for Electronic Book Reader", 10 pages.

Office Action for U.S. Appl. No. 14/246,999, mailed on Mar. 24, 2016, Kim, "Last Screen Rendering for Electronic Book Reader", 11 pages.

\* cited by examiner

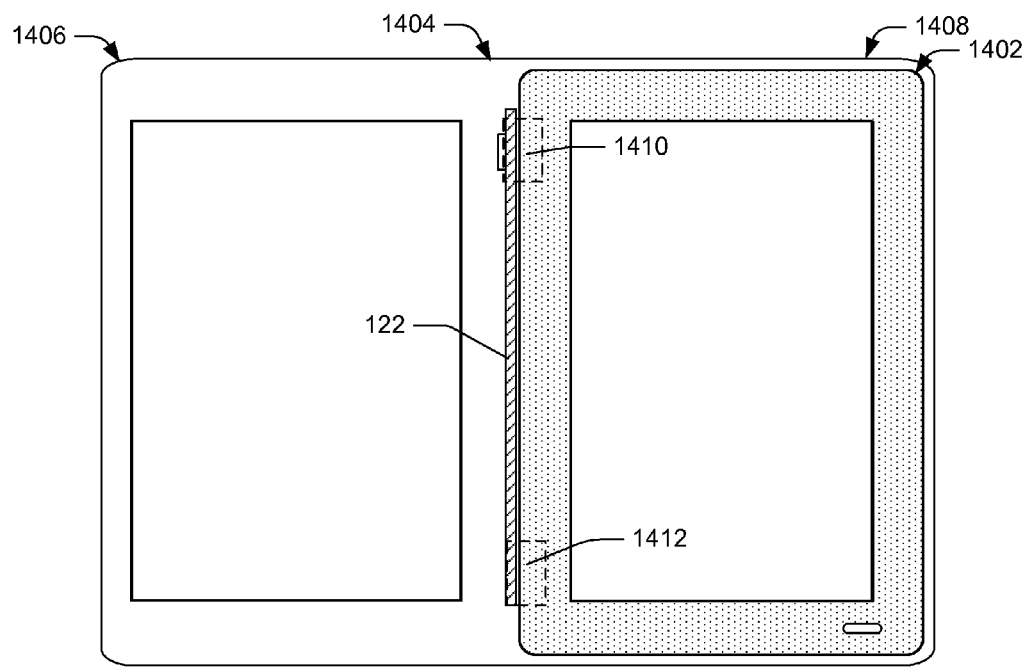
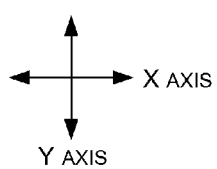
Fig. 14

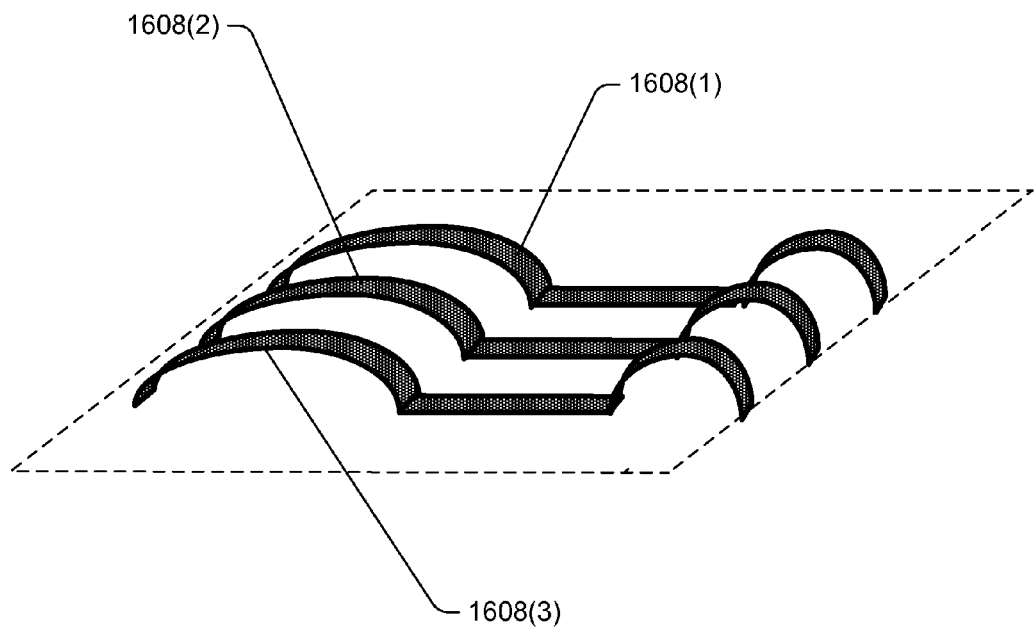
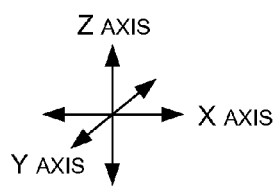
Fig. 18

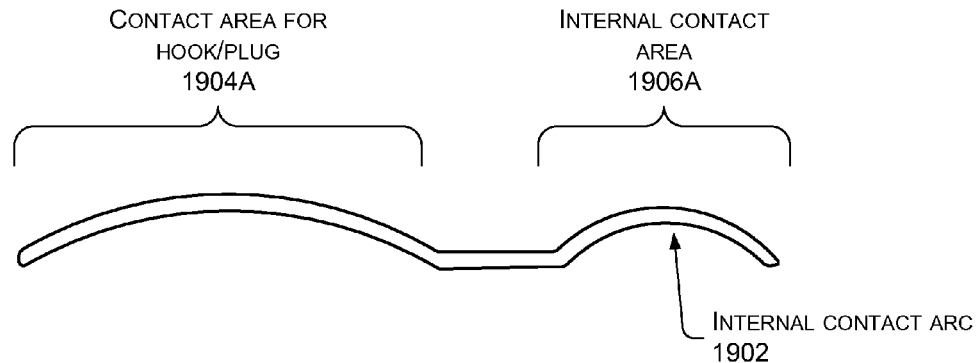
FIG. 19A
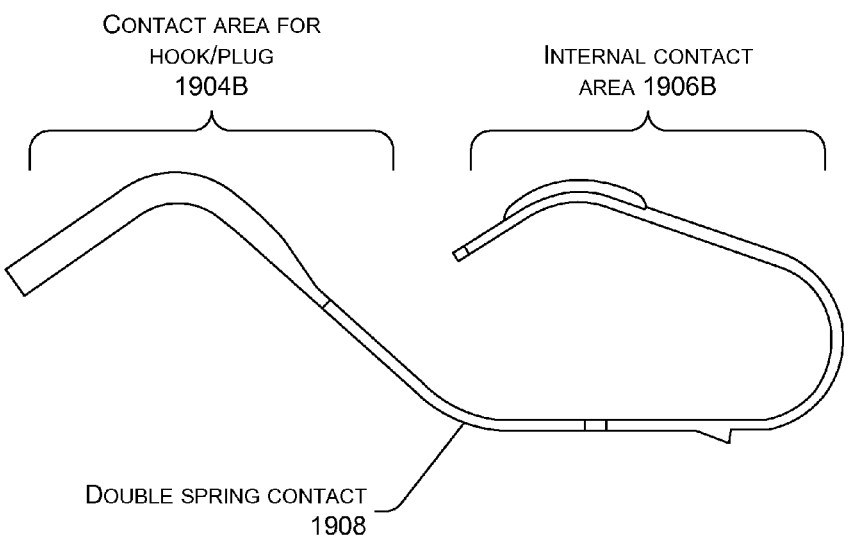
FIG. 19B
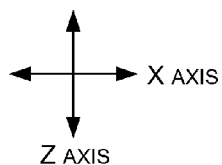

COVER DISPLAY

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistant (PDA), portable media players, tablet computers, netbooks, and the like.

One particular device that is gaining in popularity is the dedicated electronic book ("eBook") reader device, which attempts to mimic the experience of reading a conventional book through display of electronic information on one or more electronic displays. As the quantity of available media content continues to grow, along with increasing proliferation of such dedicated devices to consume that media content, finding ways to enhance user experience continues to be a priority. As eBook reader devices continue to evolve, there remains a need for improving a reader's ability to relate comfortably with the eBooks, and begin to feel as though he is picking up the book itself, rather than a generic electronic device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 14 is a front view of the eBook reader device and eBook cover, showing first and second accessory connectors.

FIG. 18 is a perspective view of contacts within the second accessory connector.

FIGS. 19A and 19B collectively illustrate cross sections of two contact configurations.

DETAILED DESCRIPTION

This disclosure describes a cover that may be used with an electronic device, such as a cellular telephone, a personal digital assistant (PDA), a portable media player, a tablet computer, a netbook, a laptop computer, an electronic book ("eBook") reader device, or any other type of electronic device. In one example, the cover comprises a cover for an eBook reader device that includes a reader display upon which eBooks can be rendered. The eBook cover has its own display, referred to herein as a cover display, upon which other information or graphics can be rendered. In some embodiments, the content displayed on the cover display may be unrelated to the eBooks that are consumed on the eBook reader device. For example, the cover may be configured to display promotional information, user-supplied pictures, owner information, or other content specified by the cover owner or someone who has provided the cover. In other embodiments, the cover may communicate with the eBook reader to determine what is currently being consumed on the eBook reader, and may display content that is related to the currently consumed content. For example, the cover may display cover art that is associated with the eBook currently being consumed on the eBook reader device. In addition, or alternatively, the eBook cover may display a title page, a progress indicator, bibliographic information, or other data relating to the eBook currently being consumed. In some embodiments, the cover may have multiple cover displays to display different types of information.

eBook Cover Configurations

Figure 1:
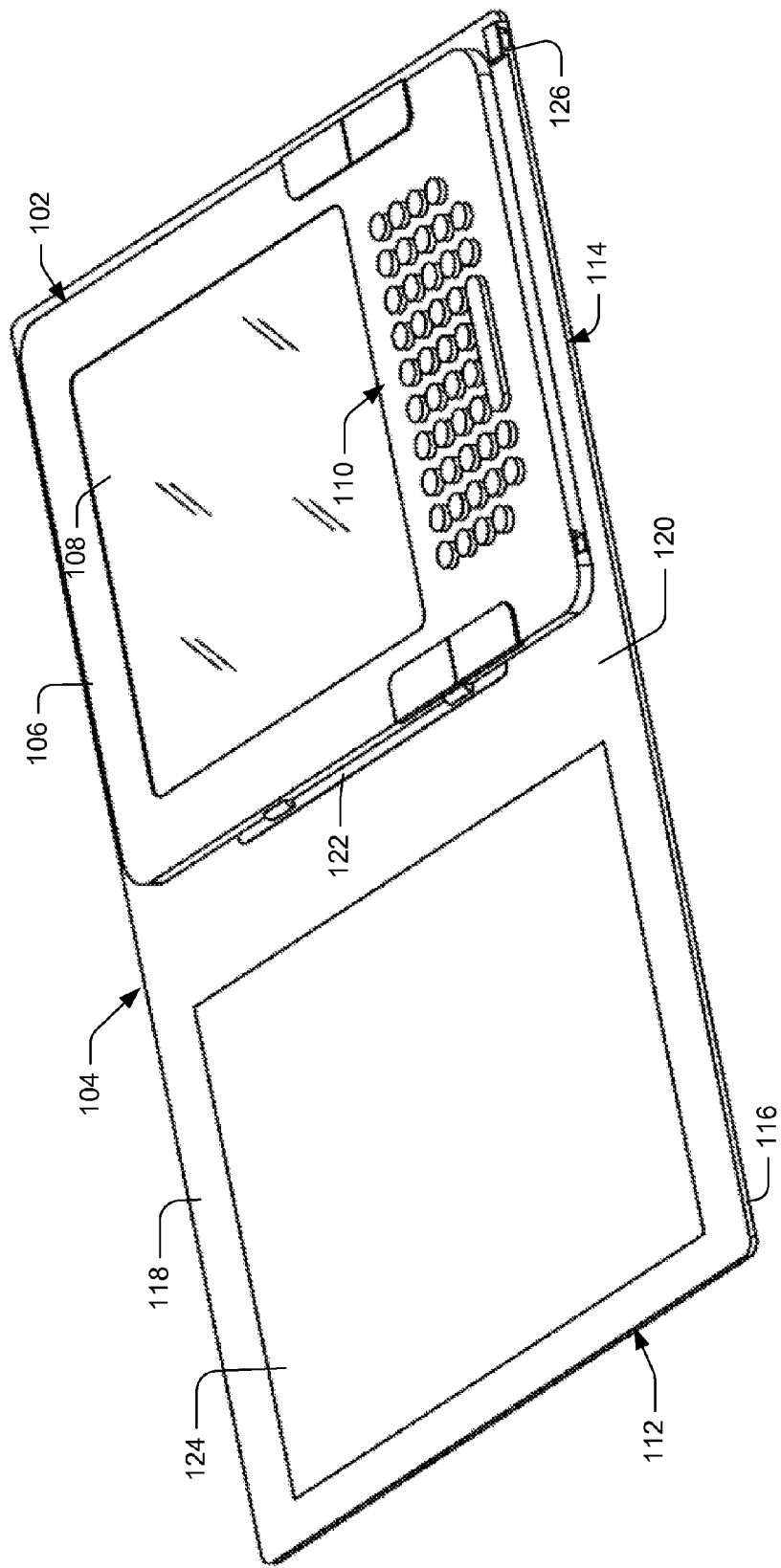
FIG. 1 is a front view showing one example implementation of a handheld dedicated electronic book ("eBook") reader device and an associated eBook cover having one or more integral displays.

FIG. 1 shows an example of an eBook reader device 102 and an associated eBook cover 104. The eBook reader device 102 in this embodiment is a portable, hand-held device, having a slate-like shape. It has a generally planar front surface 106 within which is a flat, two-dimensional display surface 108. Display surface 108 is referred to generally herein as a reader display 108.

The eBook reader device 102 is configured to render the text of an eBook on the reader display 108. In addition to text, the reader display may depict illustrations, tables, or graphic elements that might be contained in eBooks.

The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The eBook reader device 102 has one or more buttons or keys 110 that can be used by a human reader to navigate through the text of an eBook and to perform other user interface functions. The buttons or keys 110 may include page turning buttons, a joystick, navigational keys, a power on/off button, selection keys, joystick, touchpad, and so on.

The reader display 108 may include touch screen capabilities that allow user input through contact or gesturing relative to the display. For convenience only, the reader display 108 is shown in a generally rectangular configuration. However, it is understood that the display 108 may be implemented in any shape, and may have any ratio of height to width. Also, for stylistic or design purposes, the reader display 108 may be curved or otherwise non-linearly shaped.

While the reader display 108 may be implemented using any suitable display technology, in some implementations the reader display 108 is implemented electronic paper ("ePaper") display technology. A characteristic of ePaper display technology is that the display is bi-stable, meaning that it is capable of holding text or other rendered images even when very little or no power is supplied to the display. Thus, the last screen image rendered on the display can be maintained and visible for very long periods of time, such as days or weeks. In addition, this technology can produce very high contrast ratios, similar to that of printed paper.

The eBook cover 104 of FIG. 1 can be implemented as a detachable or removable accessory to the eBook reader device 102. Alternatively, the eBook cover 104 may be integrated more closely with the eBook reader device 102, and may form an integral, non-removable part of the eBook reader device 102.

The eBook cover 104 in this embodiment comprises a front flap 112 and a rear flap 114. The front flap 112 has a flat, planar shape, with a front or outer surface 116 and an opposing rear or inner surface 118. In the following discussion, the outer surface 116 may at times be referred to as the outside front cover surface, and the inner surface 118 may at times be referred to as the inside front cover surface.

In the illustrated position, the eBook cover 104 is open, with the front flap 112 generally parallel or in the same plane as the eBook reader device 102. In this position, the inner front cover surface 118 faces the user, and the outer front cover surface 116 faces away from the user.

The front flap 112 is hinged at or near its junction with the eBook reader device 102, in the general area indicated by reference numeral 120, and is therefore moveable to be positioned over the reader display 108 of the eBook reader device. In particular, it can be folded or turned upward and to the right, to be positioned over and covering the reader display 108. In the closed position, the inner front cover surface 118 faces and lies adjacent the reader display 108.

The rear flap 114 is positioned behind the eBook reader device 102. The hinge or spine portion 120 joins the front and rear flaps 112 and 114.

The eBook reader device 102 may be attached to the front of the rear flap 114. This attachment may be by one or more attachment elements, including straps, adhesives, hook-and-loop materials, mechanical latches, and so forth. In the illustrated embodiment, the eBook cover 104 has a coupler or accessory connector 122 that releasably or detachably couples the eBook reader device 102 to the eBook cover 104. In example of FIG. 1, the eBook reader device 102 has receptacles or other elements that cooperate with the coupler 122 to latch the eBook reader device 102 to the eBook cover 104. In addition to providing physical coupling, the coupler 122 may function as a data coupler to provide data communications with the eBook reader device 102. Further details regarding an embodiment of coupler 122 will be described in more detail below.

The eBook cover 104 has a flat display panel 124 incorporated within its inner front surface 118. This display panel, as well as other examples of displays incorporated within the eBook cover 104, will be referred to herein as a cover display.

The cover display 124 may be implemented using various technologies, including the ePaper technology mentioned above. The cover display 124 may also be implemented using monochrome or color technologies with LED (light emitting diode), LCD (liquid crystal display), OLED (organic light emitting diode), or other technologies that are available or may become available. ePaper-like displays that may be used with the implementations described herein include bi-stable LCDs, MEMS, cholesteric, pigmented electrophoretic, and others. In other implementations, or for other types of devices, the cover display 124 may further include a touch screen interface. In some implementations, a touch sensitive mechanism may be included with the display to form a touch-screen display.

In the same or different implementations, the cover display 124 may be a flexible display and further include a touch sensitive membrane, film, or other form of sensing material. The flexible display may be positioned, for example, above a touch sensor(s). The touch sensor(s) may be a resistive touch sensitive film. The flexible display may also include a protective layer made of a flexible material such as plastic. The flexible display may also include a flexible backplane layer. The backplane may also be made of a flexible material, such as plastic, metal, glass or a polymer based material. A flexible backplane may be bendable, rollable, light-weight, etc.

The cover display 124 may be of various sizes and shapes. In the illustrated example, the cover display 124 occupies most of the inner front cover surface 118 of the front flap 112. It may be smaller in other embodiments, and may be implemented using multiple discrete display panels.

In some embodiments, the eBook cover 104 may have integral control logic or electronics to drive and control the cover display 124. Such control logic may range from very simple to relatively complex, depending on functional objectives and the types of content desired to be displayed on the cover display 124. The cover display 124 may in some embodiments communicatively couple to the eBook reader device 102, and the eBook reader device 102 may control aspects of the cover display 124. In some embodiments, the eBook cover 104 may have control logic that communicates with the eBook reader device 102 to determine information that will be displayed on the cover display 124. In some embodiments, the eBook cover may have one or more communications ports 126 that allow external configuration and control of cover display 124. Examples of such communications ports will be explained with reference to FIG. 2.

Figure 2:
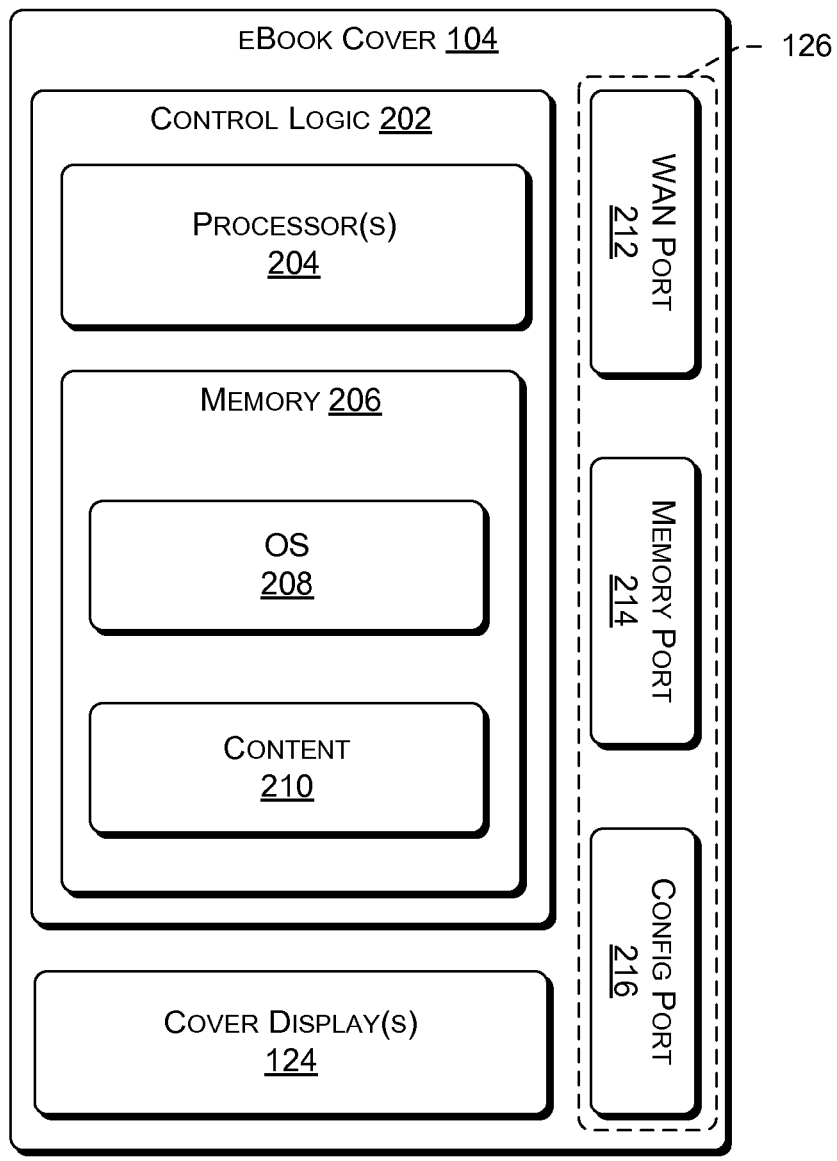
FIG. 2 is a block diagram showing selected components of the eBook cover.

FIG. 2 shows an example of integral control logic and electronics that might be incorporated in some embodiments of the eBook cover 104. In this example, the eBook cover 104 has control logic 202 that controls operation of the cover display 124 and interacts with users or external devices to determine what to display on the cover display 124. The control logic 202 may comprise one or more processors 204 and associated memory 206. Generally, the memory 206 stores programs or program modules that are executable by processors 204 to implement the functionality of the eBook cover 104, including the functionality described herein. In this example, the memory contains an operating system 208 and cover content 210.

The operating system 208 implements general functionality of the cover 104, including communications, display control, content selection, user interface if needed, and so forth. The cover content 210 comprises text, graphics, or other visual materials that are potentially to be displayed on the cover display 124. The content 210 can be specified by a user or pre-configured by a manufacturer, seller, operator, or owner of the eBook cover 104.

The eBook cover 104 may be configurable through several different communication ports, referred to above as ports 126. In this example, the communications ports 126 include a WAN port 212, a memory port 214, and a configuration port 216. Any one or more of these ports may be used in any particular embodiment, and different types of communication and configuration ports may be used in place of or in addition to those illustrated and discussed herein.

The WAN port 212 may comprise a network communications port such as a WiFi interface or cellular communications interface. The memory port 214 may be of a type that communicates with portable or removable memory cards or memory sticks, such as portable flash memory devices or other types of removable or external storage components. For example, memory port 214 may comprise a USB (universal serial bus) port or some variation thereof. Alternatively, it may utilize other protocols that are compatible with widely used memory devices, such as memory devices used with digital cameras and other media devices. Configuration port 216 may be a USB port or other interface designed to allow access to and configuration of the eBook cover 104 by an external device such as a personal computer or other controller.

The operating system 208 may be configured in various ways to obtain the content 210 using these communications ports. For example, the operating system may be configured to respond to the connection of a memory card to memory port 214 by displaying any content stored on the memory card. When a memory card is connected, the operating system may scan the memory card for graphics files that can be displayed on the cover display 124. The operating system may then render those graphics files in a repeatable sequence on the cover display 124.

In practice, a user may store picture files on a memory card and then insert it into the memory port 214 of the eBook cover 104. The operating system 208 may respond by creating a slide show from the picture files, and repeatedly rendering the pictures of the slide show on the cover display 124 in some implementations.

Functionality such as this might be used by advertisers to promote companies, products, services, etc. For example, the eBook cover 104 might be distributed as a promotional, give-away item to promote a particular entity. In order to configure the eBook cover to display promotional content, such content might be stored on a memory card that is then installed in the memory port 214 of the eBook cover 104. In this configuration, a user could subsequently replace or reprogram the memory card to configure the eBook cover to display different, personalized information or graphics.

Similar functionality might be implemented through the configuration port 216. For example, a user might connect the eBook cover 104 to the user's personal computer, and then copy pictures, graphics, or other displayable content to the eBook cover 104 to be subsequently displayed on the cover display 124. A user might also, or alternatively, configure the eBook cover with personal information such as the user's name and address, to be displayed on the cover display 124 to identify the user as the owner of the eBook cover 104 and its associated eBook reader device 102.

When the eBook cover 104 is used as a promotional vehicle, a promoter might use the configuration port 216 to designate specialized content and advertising relating to the promoter, so that such content and advertising is shown on the cover display 124. In this situation, the eBook cover may or may not be reconfigurable by the user to display different information.

The cover content 210 may alternatively be obtained using the network port 212. The operating system 208 may utilize the network port 212 to poll a network source, such as a server or other computer, for content that is to be displayed on the cover display 124. A push delivery mechanism might alternatively be used, wherein a server or other network source notifies the eBook cover 104 when new content is available for display on cover display 124.

Figure 3:
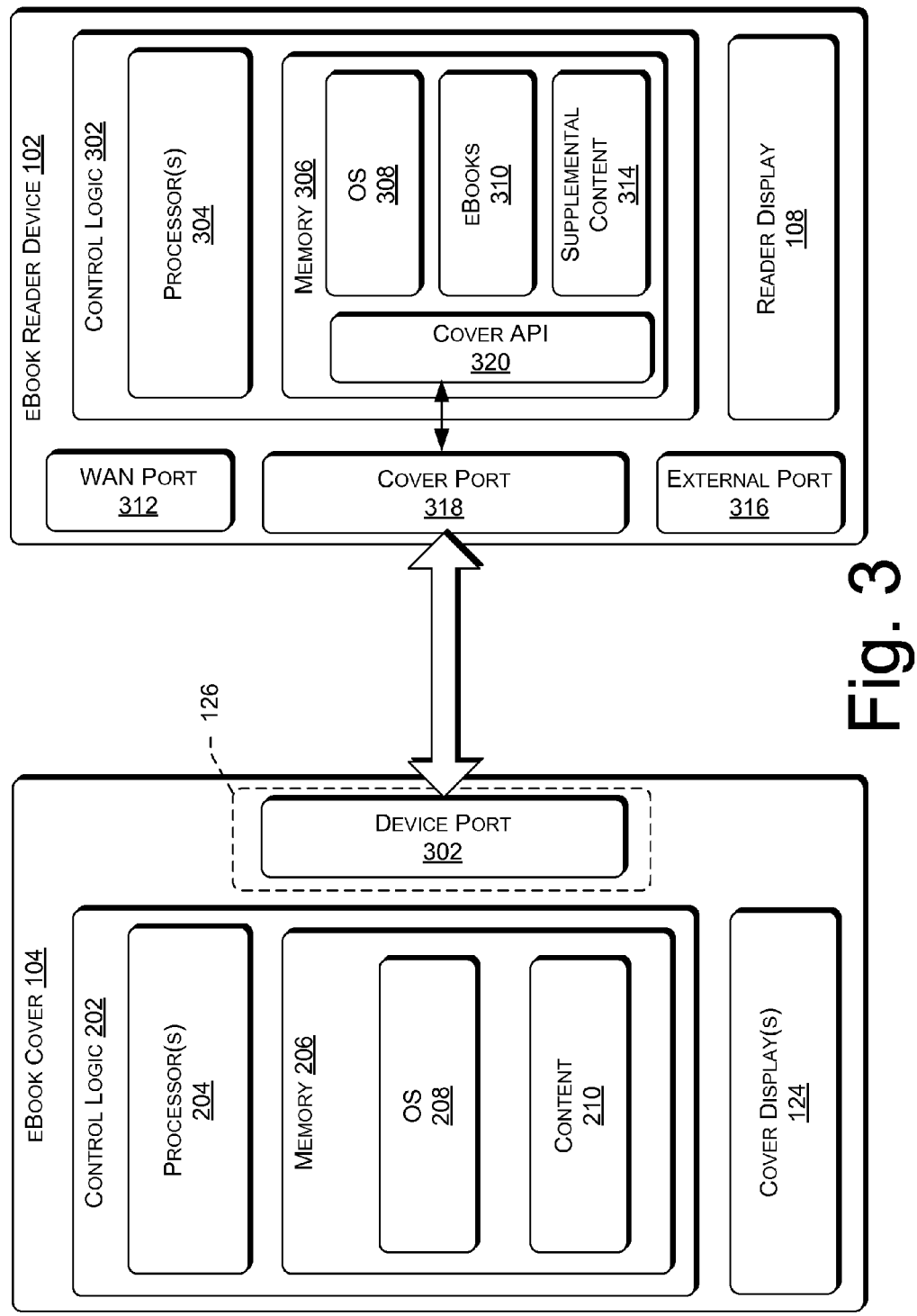
FIG. 3 is a block diagram showing selected components of the eBook cover and the eBook reader device.

FIG. 3 shows an example in which the eBook cover 104 is more closely associated with the eBook reader device 102 to which it is attached. More specifically, the embodiment of FIG. 3 includes a dedicated means of communication between the eBook cover 104 and the eBook reader device 102. In this embodiment, the eBook cover 104 can receive its cover content 210 or other information from the eBook reader device 102.

In the example of FIG. 3, the eBook reader device 102 and the eBook cover 104 have independent operating logic. Note that only a general configuration of each device is illustrated, showing high level components most relevant to this discussion. Both the eBook reader device 102 and the eBook cover 104 may be implemented in many different ways other than the specific implementation shown here.

The eBook cover 104 is largely as described with reference to FIG. 2, including the one or more processors 204, the memory 206, the operating system 208, the cover content 210, and the one or more cover displays 124. In this example, however, the communication ports 126 of the eBook cover 104 comprise a device port 302 for data communication with the eBook reader device 102. Physically, the device port may be integrated with the coupler 122, shown in FIG. 1. Electronically, the device port 302 may use one or more existing wired communication protocols, such as a USB (universal serial bus). Alternatively, the device port 302 might be implemented using one or more wireless technologies.

The eBook reader device 102 has control logic 302 that may comprise one or more processors 304 and associated memory 306. The memory 306 stores programs or program modules that are executable by the processors 304 to implement the functionality of the eBook reader device 102, including the functionality described herein. The memory 306 may comprise nonvolatile and/or volatile memory, including RAM, ROM, EEPROM, flash memory, other memory technology, or any other machine-readable storage media. The memory 306 may include removable and/or non-removable memory.

The memory 306 may be used to store any number of functional components that are executable on the processor 304, as well as data and content items that are rendered by the eBook reader device 102. Thus, the memory 306 may store an operating system 308 and an eBook storage database to store one or more eBooks 310 or other content items such as audio books.

The operating system 308 provides menus and other navigational tools to facilitate selection and rendering of the eBooks 310. The operating system 308 may further include a browser or other application that facilitates access to sites over a network, such as websites or online merchants. In addition, the operating system 308 contains logic and modules for controlling the reader display 108, for rendering eBooks on the reader display 108, and for navigating through rendered eBooks in response to user input.

The eBook reader device 102 may have various communications ports for configuration and for obtaining eBooks and other content. In this example, the eBook reader device 102 has a WAN port 312, which may comprise a wireless network communications port such as a WiFi port or a cellular network communications port. The operating system 308 uses the WAN port 312 to communicate with a server or service provider (not shown), and to purchase and download eBooks 310 and other materials or content that may be displayed on the reader display 108.

In addition to downloading eBooks 310 from a server or service provider, the eBook reader device 102 may download various supplemental content 314 corresponding to each of eBooks 310. The supplemental content may comprise bibliographic data, metadata, cover art, additional or related content, illustrations, user-provided materials such as pictures and comments, and so forth, and may be obtained from various sources, such as publishers, instructors, experts, online sources, published materials, and so forth.

The eBook reader device 102 may also include a wired communications port, referred to herein as an external port 316, for connection to and configuration by an external device such as a personal computer. The external port 316 may comprise a USB port or might utilize some other protocol. In some embodiments, the eBooks 310 and other content, including the supplemental content 314, may be transferred from an external device to the eBook reader device 102 through the external port 316 rather than through the WAN port 312.

The eBook reader device 102 also has a cover communications port 318 for connection with the device port 302 of the eBook cover 104. The cover port 318 is configured to use the same communications protocol as the device port 302 of the eBook cover 104, which in some embodiments may be the USB communications protocol, and in other embodiments may be a wireless communications protocol. Physically, the cover port 318 may be integrated with any mechanisms used to attach the eBook cover 104 to the eBook reader device 102. Thus, the data connection between the eBook cover 104 and the eBook reader device 102 can be established automatically whenever the eBook cover 104 is physically attached to the eBook reader device 102.

The operating system 308 may include an application programming interface 320, referred to herein as a cover API 320, that can be called by the eBook cover 104 for interaction between the eBook cover 104 and the eBook reader device 102. Although the cover API 320 may be implemented by the operating system 308, it is shown explicitly in FIG. 3 for purposes of discussion. Also note that the cover API 320 may be implemented apart from the operating system 308 in some embodiments.

In the embodiment of FIG. 3, the eBook cover 104 periodically queries the eBook reader device 102, using the cover API 320 via the device port 302 and the cover port 318, to obtain the supplemental content 314. The eBook cover receives the supplemental content 314 and uses it as its cover content 210, displaying it on the one or more cover displays 124. While the eBook cover 104 may obtain the supplemental content 314 from the eBook reader device 102 in some instances, in other instances the cover 104 may obtain the supplemental content from a remote source, such as wirelessly over the Web.

In addition to the supplemental content 314, the eBook cover 104 may obtain configuration information or commands from the eBook reader device 102, containing specific instructions or information regarding the desired behavior of the eBook cover 104.

In different embodiments, specific operational behavior of the eBook cover 104 may be dictated by either the eBook cover itself or the eBook reader device 102. Responsibility for updates may also be placed with either the eBook cover or the eBook reader device 102. Generally, the various functionality described herein can be under the control of either the eBook cover 104, the eBook reader device 102, or some combination of the two devices. Similarly, communications may be initiated by either the eBook cover 104, the eBook reader device 102, or both.

Also, the display content 210 can be obtained by the eBook cover 104 from the eBook reader device 102, or from an independent device such as an associated computer, a network-based server, or an Internet-based service provider—independently of the eBook reader device. Generally, the cover content 210 and other configuration information can be communicated using the device port 302 of FIG. 3, and/or through one or more of the communication ports 212, 214, and 216 shown in FIG. 2. Information can be "pushed" to the eBook cover 104, or the eBook cover 104 may be configured to query various sources, including online sources and the eBook reader device 102, to obtain display content 210.

The eBook reader device 102 may be configured to enable enhanced functionality when the eBook cover 104 is attached to the eBook reader device 102. For example, additional user interface elements may be enabled allowing a user to choose from different cover display configurations and/or to specify cover content. Furthermore, some embodiments of the eBook reader device 102 may allow a user to install applications on the eBook reader device 102, and may allow those applications to interact with and utilize any available displays on the eBook cover 104. An application, for example, might implement a game or puzzle using display capabilities of the eBook cover 104. An application may also be configured to obtain and display various different types of information. A stock ticker, for example, could be implemented by a user-installed application program, using the display of the eBook cover 104.

Figure 4:
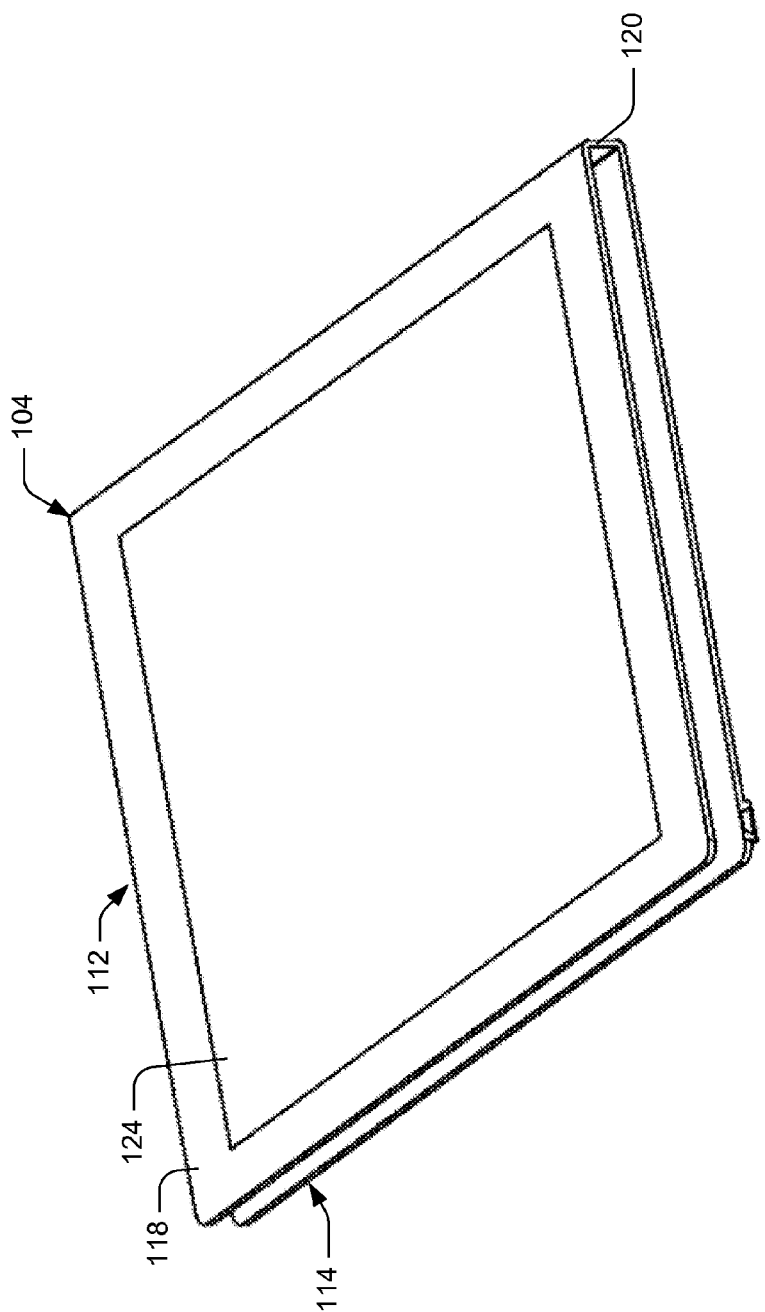
FIG. 4 is a rear view the eBook reader device and associated eBook cover, with the cover folded back over the rear of the eBook reader device.

FIG. 4 shows another view of the eBook cover 104. In this rear view, the front flap 112 has been folded around behind the eBook reader device 102 (not visible in FIG. 4) and rests behind the rear flap 114 of the eBook cover 104. The eBook cover might be used in this position at times, when a user is reading an eBook. In this position, the cover display 124 might be visible to other people who happen to be nearby when the user is reading.

Figure 5:
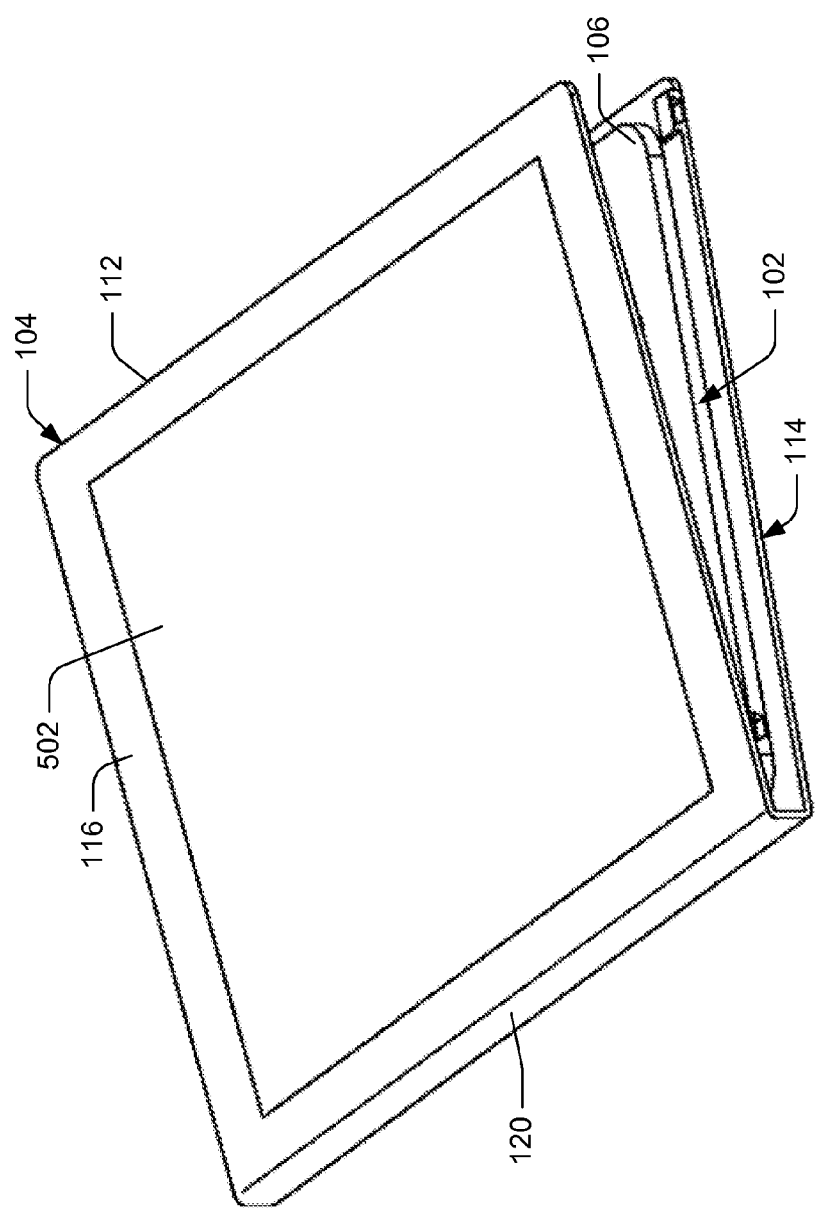
FIG. 5 is a front view of the eBook reader device and associated eBook cover, with the cover folded forward to a nearly closed position.

FIG. 5 shows yet another view of the eBook cover 104. In this front view, the front flap 112 has been folded up and over the eBook reader device 102, almost to its closed position in which it would rest over and cover the reader display 108 (not visible in FIG. 5) of the eBook reader device 102. This view illustrates that eBook cover 104 has an outer cover display 502, positioned on the outer front cover surface 116 of the eBook cover 104 and occupying most of the area of the outer front cover surface 116. This outer cover display 502 may be an alternative to the inner cover display 124 of FIG. 1, or in addition to the inner cover display 124. It is primarily useful either when the eBook reader device 102 is not being used to consume content and its cover is closed, or when the eBook cover 104 is open and the user is holding the cover and reader device so that other nearby people can see the outer cover display 502.

Figure 6:
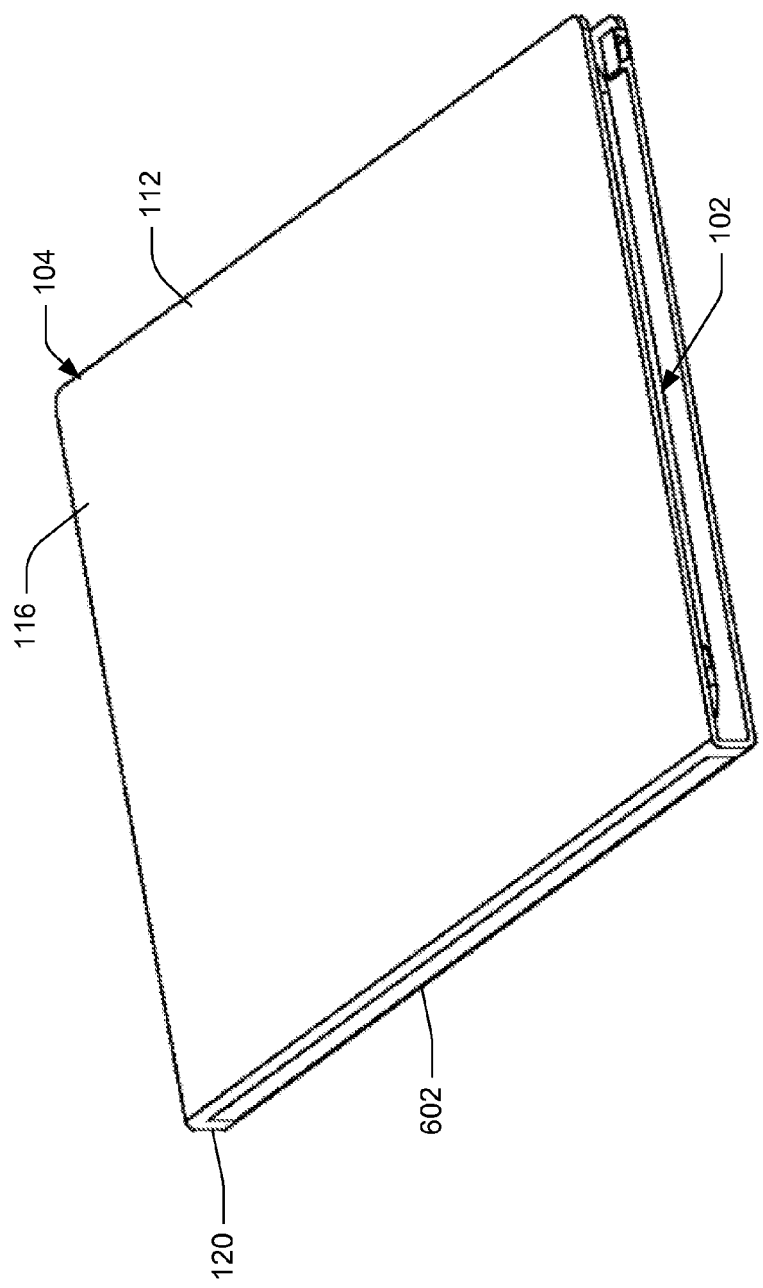
FIG. 6 is a front view of an eBook reader device and associated eBook cover, with its cover folded forward to a closed position.

FIG. 6 shows a configuration of the eBook cover 104 having an edge or spine cover display 602, positioned on the outer spine 120 or other edge of the eBook cover 104. In the closed position illustrated in FIG. 6, the front flap 112 of the eBook cover 104 is folded up and to the right, positioned so that it overlies and covers front surface 106 and reader display 108 (not visible in FIG. 6) of the eBook reader device 102. The spine cover display 602 is visible when the eBook cover is closed and lying on a surface or placed on upright on a bookshelf. It may also be visible to other nearby people when a user is actively reading on the eBook reader device 102. The cover display could alternatively be positioned on the inner surface of a cover spine.

Different embodiments of the eBook cover 104 may use one or more displays in various positions including those illustrated herein. For example, one embodiment may include displays on the spine, on the front cover, and on the inner or inside front cover of the eBook cover 104. Another embodiment may include only a single display, located on an edge of the cover, on the front of the cover, or inside the cover. Furthermore, multiple displays might be positioned on the same surface, such as the inside front of the eBook cover 104. Such displays might be used for different purposes, to display different information. They may also be implemented using different display technologies. For example, one display might be implemented using e-ink technology to display eBook cover art, while another display might be implemented using LCD technology to display eBook-related data only while a user is actively using the eBook reader device 102.

More generally, any display incorporated within the eBook cover 104 may use one of various display technologies, depending on design objectives. For displaying cover art, and certain types of text-based supplemental information, ePaper technology might be most appropriate because of its low power requirements and its ability to present images that persist without updating over long periods of time. For user interface functionality, active LCD displays might be more appropriate. Furthermore, the different types of displays might be touch-sensitive in some embodiments, allowing the cover device 104 to form a more significant part of a user interface. Color displays may be most appropriate for presenting certain types of information, while monochrome displays might be more appropriate for presenting other types of information.

Power may be supplied to active components within the eBook cover 104 from rechargeable batteries incorporated within the front and or rear flaps of the eBook cover 104. Alternatively, power may be drawn from the eBook reader device 102 to which the eBook cover 104 is coupled, or from other devices that are used to program and configure the eBook cover 104.

Usage Examples

The various cover displays described above can be used for a number of different purposes. Several examples will be referenced in the following discussion. Although the examples utilize the inside front cover surface of the illustrated eBook cover, it should be understood that the same things can also be displayed on other surfaces, such as the outside front cover, an edge such as a spine, or portions of the back cover. Furthermore, the information and content described in the examples can be displayed on a number of different cover displays or screens integrated within the eBook cover, and the displays can be positioned and sized quite differently than illustrated herein. Also, the various types of content and information might be combined in different ways, depending on desired usage and design objectives.

Figure 7:
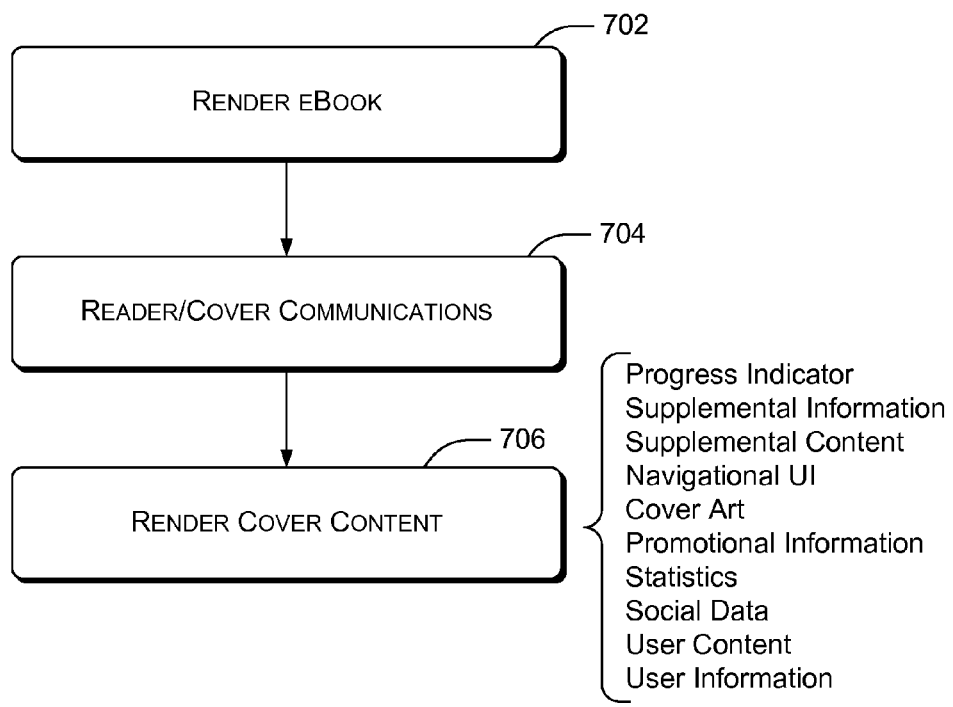
FIG. 7 is a flow diagram illustrating an example process for using an eBook cover in conjunction with an eBook reader device.

FIG. 7 illustrates a generalized method for using a cover with an eBook reader device. At 702, the eBook reader device renders an eBook on its reader display. At 704, the eBook reader device and its eBook cover communicate with each other. Communication 704 may take many forms. In some embodiments, the purpose of the communication may be merely for the eBook cover to determine which eBook is currently being rendered or was most recently rendered on the eBook reader device. In other embodiments, the eBook cover may query the eBook reader device for specific information or graphics that are to be displayed on the eBook cover. In still other embodiments, the eBook reader device may directly control one or more displays of the eBook cover. Note that communication 704 may not take place in all embodiments. Specifically, in some embodiments the eBook cover may display information that is not necessarily related to the activities being performed on the eBook reader device, and may be configured for this purpose using some device other than the eBook reader device.

At 706, cover content is rendered on one or more of the cover displays of the eBook cover. As indicated to the right of block 706, the cover content may include a number of different things, such as progress information, supplemental information, supplemental content, a navigational or other user interface, cover art, promotional materials, statistics regarding the user and others, other social data, user content, user information, and so forth. These examples will be discussed in more detail below.

Cover Art

Figure 8:
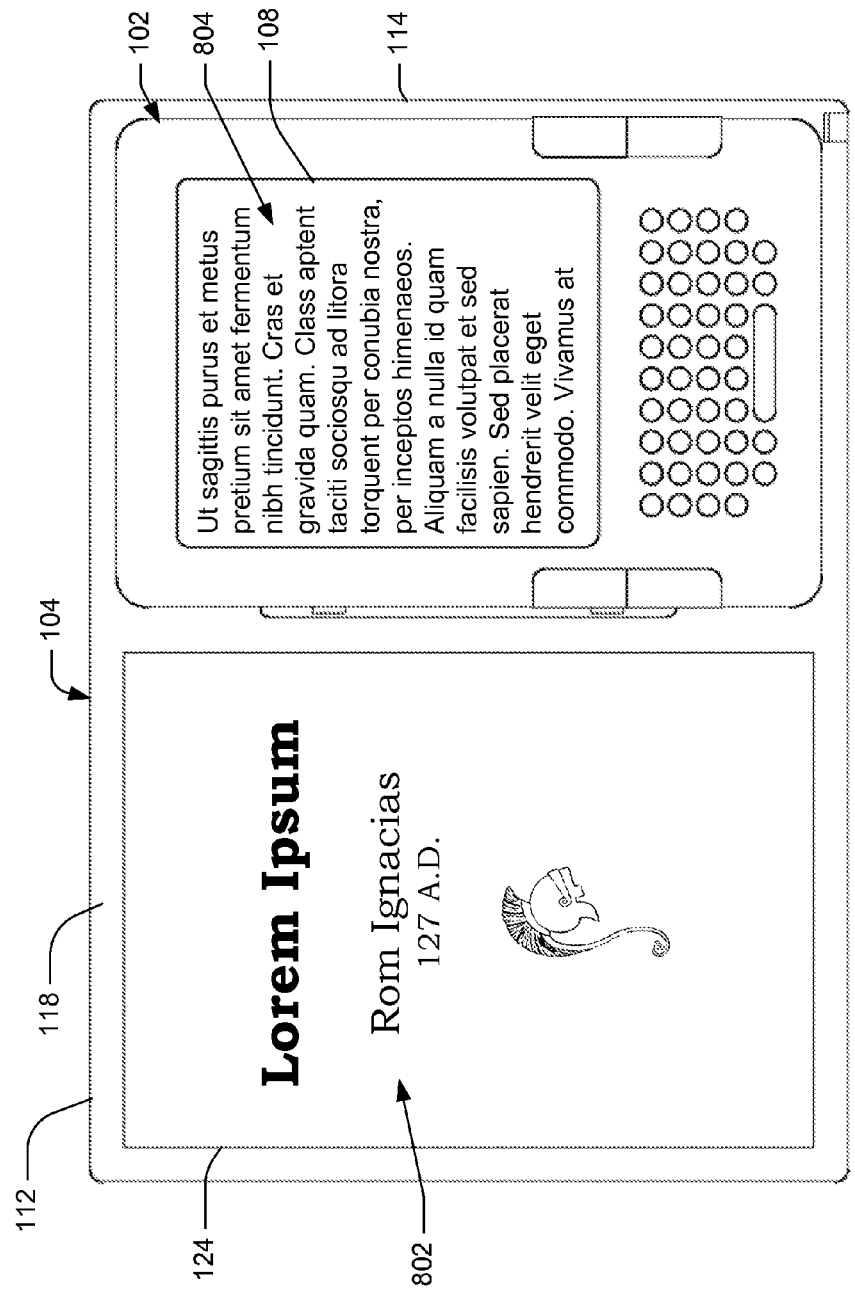
FIGS. 8 through 13 are front views of the eBook reader device and associated eBook cover, illustrating various ways of using the eBook reader device and eBook cover.

FIG. 8 shows an example of how cover art may be displayed on one of the cover displays incorporated with the eBook cover 104. In this example, a cover art image 802 is displayed on the inside front cover 118 of the eBook cover 104. The displayed cover art image 802 corresponds an eBook 804 that is displayed on reader display 108 of eBook reader device 102. When displayed as illustrated, on the inside front of the eBook cover 104, the cover art image 802 is visible to the reader when the eBook cover is open, and to nearby people when the front flap 112 of the eBook cover is folded back behind the eBook reader device 102 as shown in FIG. 4.

Alternatively, eBook cover art may be displayed on the outside front cover surface 116 of the eBook cover 104, giving an effect similar to that of a paper-based book. ePaper displays or other low-power or persistent displays may be particularly appropriate for this situation, so that eBook cover art can be persisted when the eBook reader device is not in use, such as between reading episodes. This reminds the user what they are reading, and also allows the user to become familiar with the cover art and any information that might be incorporated with the cover art, such as the eBook title and author name. A spine display, as shown in FIG. 6, might be used in combination with a front display to further enhance this effect, making the cover art and associated book information visible regardless of how the eBook reader device is positioned. Some embodiments might show small portions of cover art, including the title and author, on the spine of the eBook cover, either alone or in combination with a front cover display.

Cover art may be obtained by the eBook cover 104 from the eBook reader device 102, and updated as appropriate whenever a user switches from reading one book to reading another book. In many embodiments, the displayed cover art will be the cover art associated with the eBook that is currently being consumed on the eBook reader device 102, or the eBook that was last being rendered on the eBook reader device 102.

In some embodiments, cover art may be obtained from sources other than the eBook reader device 102, such as from online sources or external devices. In certain embodiments, the eBook cover 104 may communicate with the eBook reader device 102 to determine what is currently being consumed, and may then obtain cover art 802 from some other source. In some cases, the eBook cover 104 may use its own networking capabilities for this purpose. In other cases, the eBook cover may utilize the communication capabilities of the eBook reader device 102 to communicate with sources of cover art.

User-Designated Content and Information

User-designated content, including text, graphics, pictures, videos, and so forth, can be displayed on cover displays of the eBook cover 104. For example, a user might transfer multiple pictures to the eBook cover 104 using one of communications ports 126, and configure the eBook cover 104 to display the pictures in sequence to create a slide show on the eBook cover 104. Other graphics can be presented in the same way, including presentation graphics.

Rather than actually supplying content for display on the eBook cover 104, a user might select from different content available from different sources such as online sources. For example, there may be online picture libraries of the user or other users that can be designated by the user for display on the eBook cover 104. At appropriate times, the eBook cover 104 might retrieve and display content from the designated library or libraries.

As another example, a user might designate personal information for display on the eBook cover 104. The eBook cover might be configured to display owner information supplied by the user, such as name, address, telephone number, and email address. This might be useful if attempting to return a lost eBook reader device to its owner. Information might also be presented in the form of a business card.

In one embodiment, a user may specify or designate items for a wishlist, and the eBook cover might display the user's wishlist on one of its displays.

Figure 9:
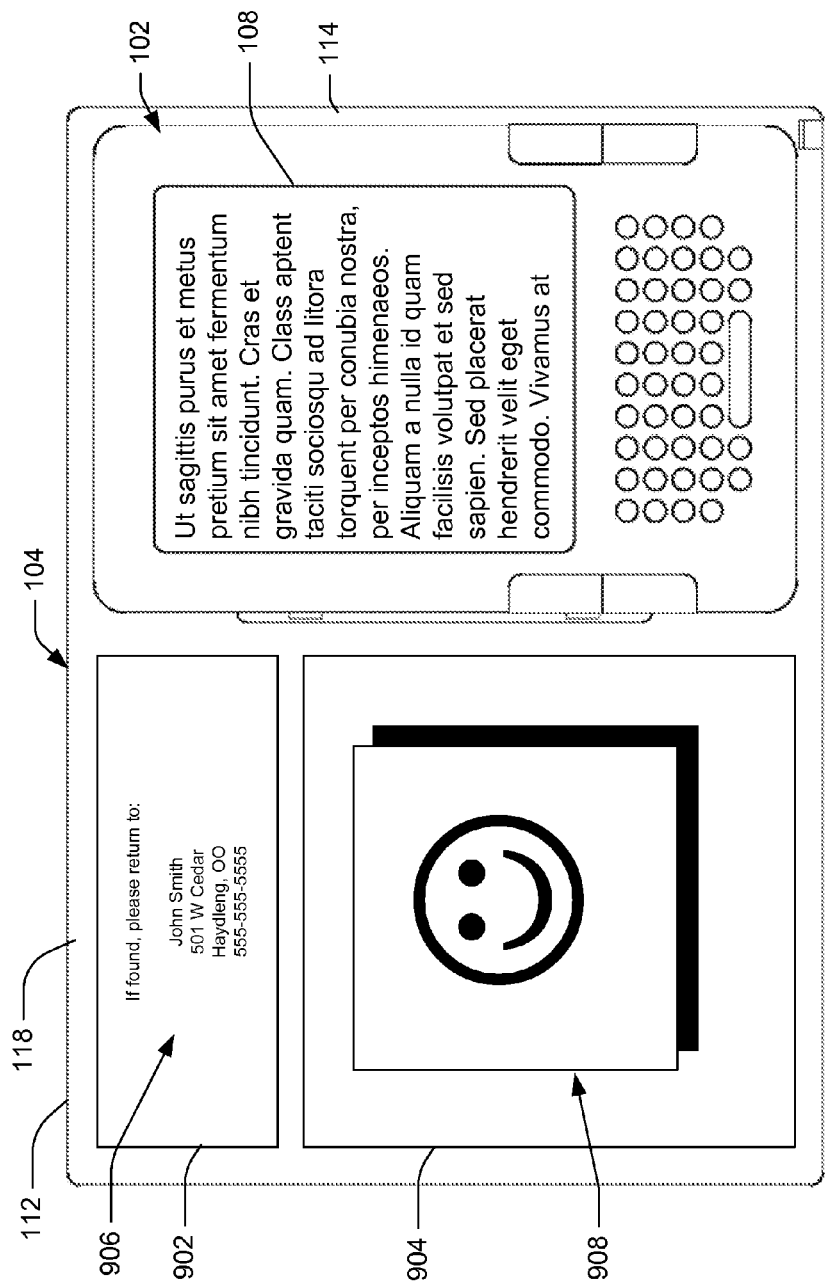

FIG. 9 shows an example of user-designated content being displayed on the eBook cover 104. In this example, the inside front cover surface 118 of the eBook cover 104 has two discrete displays: an upper cover display 902 and a lower cover display 904. The upper cover display 902 displays owner information 906, under the heading "If found, please return to:". The lower cover display 904 displays a picture 908 supplied by a user.

Supplemental Information

Figure 10:
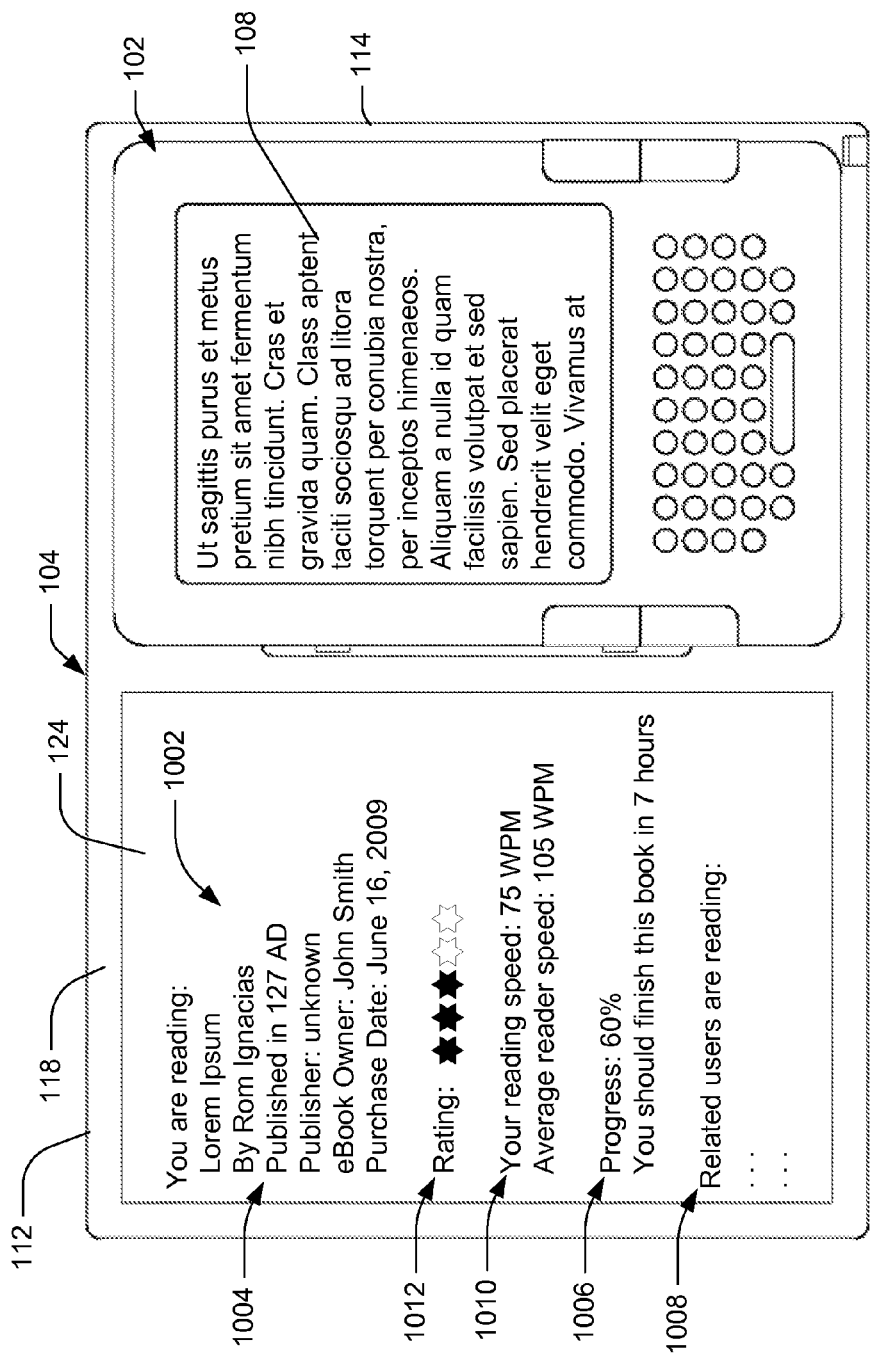

FIG. 10 shows examples of supplemental information 1002 that may be displayed on one or more of the cover displays of the eBook cover 104. Supplemental information might comprise eBook metadata such as author, publication date, book format, length, book revision number, publisher, price, purchase date, owner, etc. Supplemental information might also include bibliographic or title page information. Examples of this type of information are indicated by reference numeral 1004.

Other forms of supplemental information might include information regarding the activities of the user with respect to the currently rendered eBook, such as the current progress or location of the reader within the currently rendered eBook. This type of information is indicated in FIG. 10 by reference numeral 1006, and indicates progress as a percentage of completion, while also predicting the time that might be needed to complete the eBook, given the current reading speed.

Progress information might alternatively be displayed in the form of a gauge or other graphic image that changes with the progress of the user through the eBook. In one embodiment, cover art associated with the currently rendered eBook might be displayed on one of the cover displays, and changed over time to indicate progress of the user through the current eBook. For example, the shade or transparency of the cover art might be gradually changed. Alternatively, a cover art image might be altered to make it look more and more aged as the user progresses through the associated eBook. The aging might be a function of progress through the eBook, the amount of time the user has spent with the eBook, or the passage of time in general.

Cover displays of the eBook cover 104 might be used to display information unrelated or only loosely to the currently rendered eBook. For example, a cover display might be used to display a list of eBook recommendations or a list of eBooks that other users are currently consuming. Depending on the capabilities of the eBook reader device 102, geographic and proximity information may be available regarding other users. Here, the other users' proximity and the nature of their current eBook activities might be reported to the user of the eBook reader device 102 using one of its cover displays, assuming these other users have explicitly opted to share this information in this manner. An example of this type of information is referenced by numeral 1008 in FIG. 10.

A cover display can also be used to display a history of the user's previous reading activities, as well as statistics regarding the user's activities. A cover display can display a list of eBooks owned by the user or in the user's archive, or a list or queue of eBooks that the user intends to read next. In the example of FIG. 10, the user's reading speed is displayed at 1010 along with the average reading speed of other users.

An eBook cover display might also be used to display information from social networking sites and other information regarding status and activities of other users and online friends. Various tickers and other news and information sources might be displayed on a cover display to present real-time information as it becomes available. In the example of FIG. 10, an average of ratings given by other users is shown, referenced by numeral 1012.

Supplemental Content

Content that is supplemental to the currently rendered eBook might be displayed on one or more displays of an eBook cover 104 while reading the eBook on the eBook reader device 102. Such supplemental content might include background information related to the current eBook, author interviews, discussion/comprehension questions, graphics, pictures, videos, related works, reviews, or comments from other readers. Supplemental content might be provided by authors and publishers, or might be provided by others such as readers, reviewers, and editors. In some scenarios, there may be extra fees associated with such supplemental content.

The presentation of supplemental content on a cover display might be coordinated with eBook rendering, so that navigating to different pages or portions of the eBook causes corresponding supplemental content to be displayed. In other situations, the supplemental content, while being related to the currently rendered eBook, might be independently navigable. In embodiments with touch-sensitive screens, the information might be scrollable by swiping the cover display. In other embodiments, it may be possible to scroll through the supplemental content using other navigational mechanisms, such as buttons or other physical controls.

Figure 11:
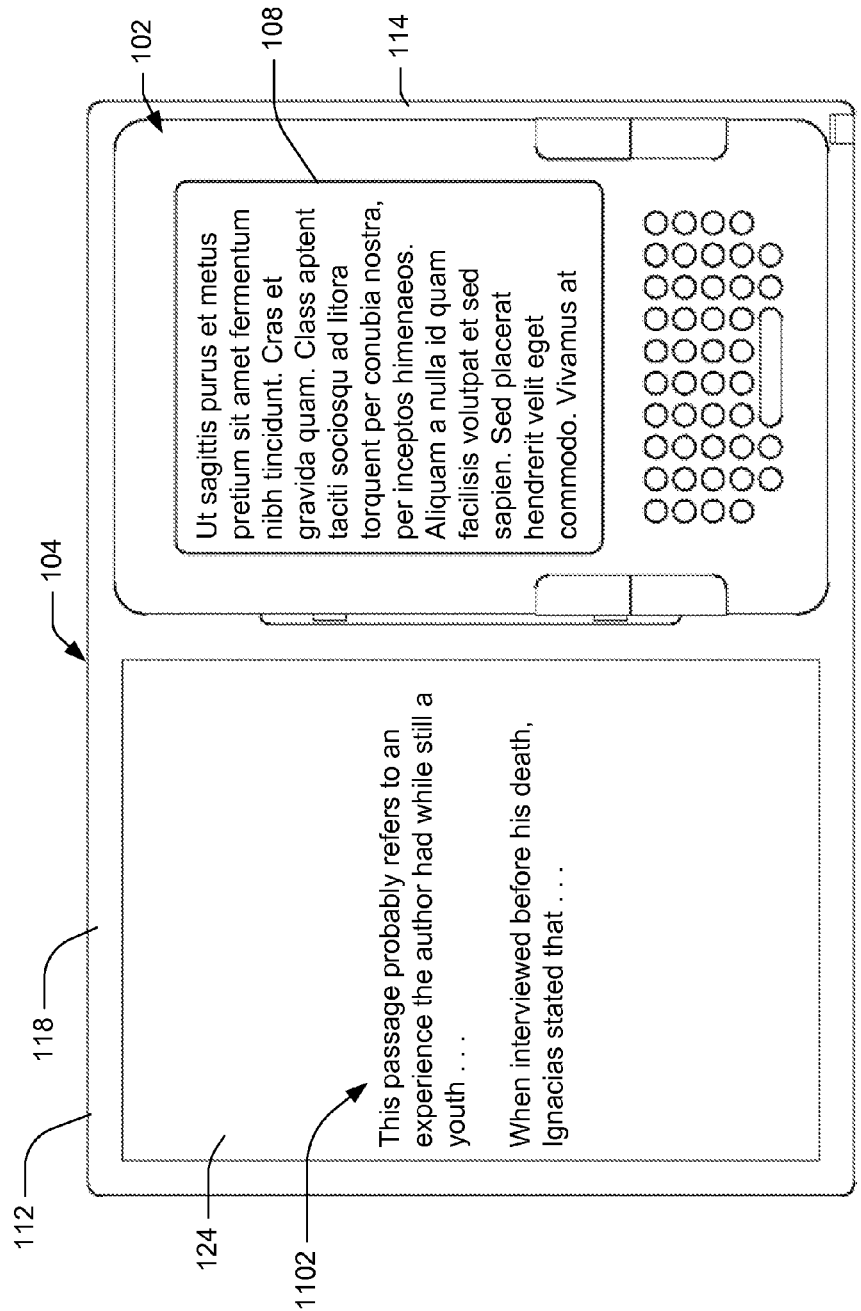

FIG. 11 shows an example of supplemental content at 1102. In this example, the supplemental content comprises commentary on the part of the eBook that is currently being rendered.

Promotional Content

The eBook cover 104 may in some cases be used to convey promotional information. For example, an eBook cover may be pre-configured to display the name and logo of a particular entity such as a company or university. This might be particularly useful in the scenario where an entity loans eBook reader devices or otherwise makes them available to multiple users. In this scenario, the eBook cover might be pre-configured to display the corporate identity of the entity providing the eBook reader devices.

Figure 12:
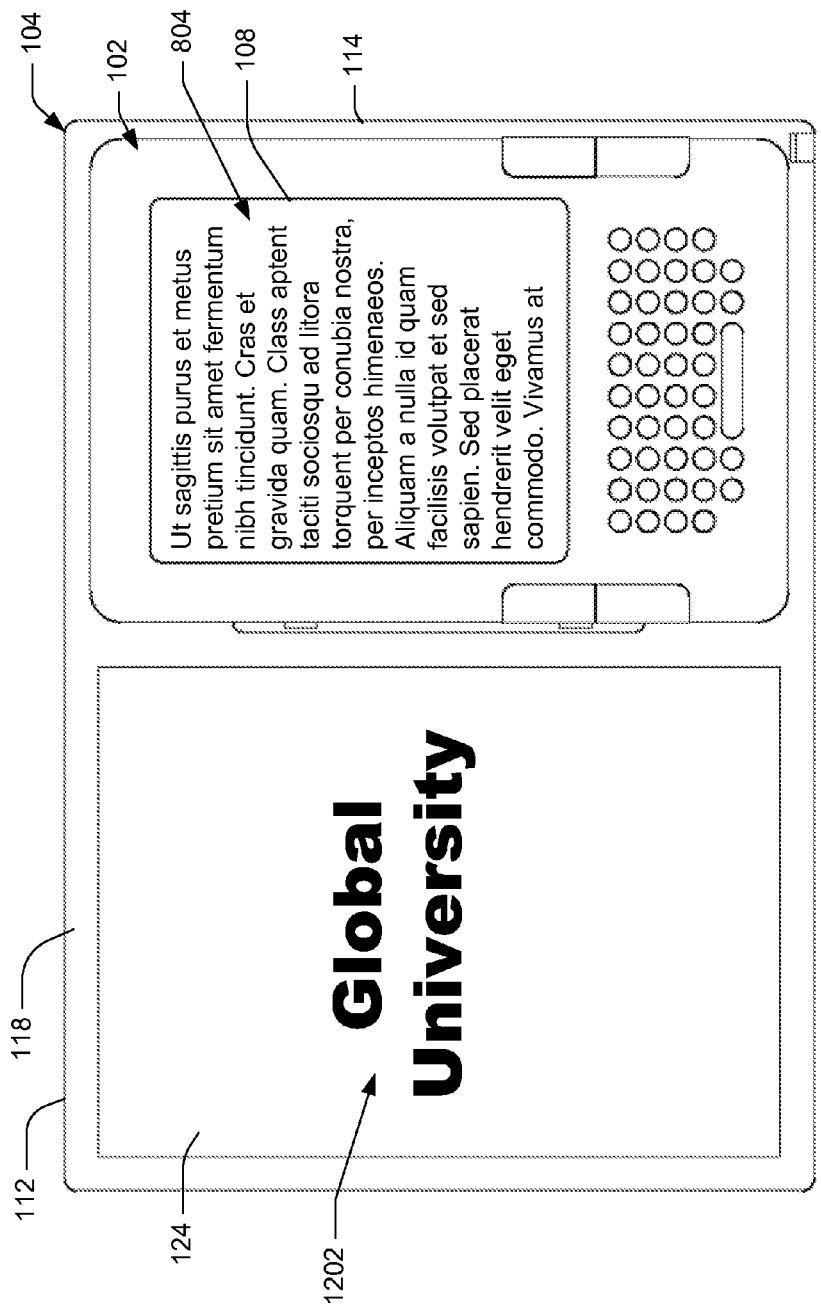

FIG. 12 shows an example in which the name 1202 of a university is displayed on the eBook cover 104.

In other scenarios, an eBook cover might be used as a give-away promotional item at an event such as a trade show. Prior to distribution, such eBook covers could be programmed or configured to display the name of the distributing entity, as well as other advertising or promotional information. In some cases, eBook covers might be programmed to display a variety of advertising, in sequence, from a number of different entities who have paid or otherwise cooperated to be included in this manner.

Navigation and User Interface

One or more cover displays might also be used as part of an eBook user interface, possibly in conjunction with the controls that are already part of the eBook reader device. The cover displays might be touch-sensitive, allowing navigation by touching. A browser can be presented on a cover display, for example, allowing the user to browse an online store or other online sites, even while an eBook is being rendered on the eBook reader device 102.

Figure 13:
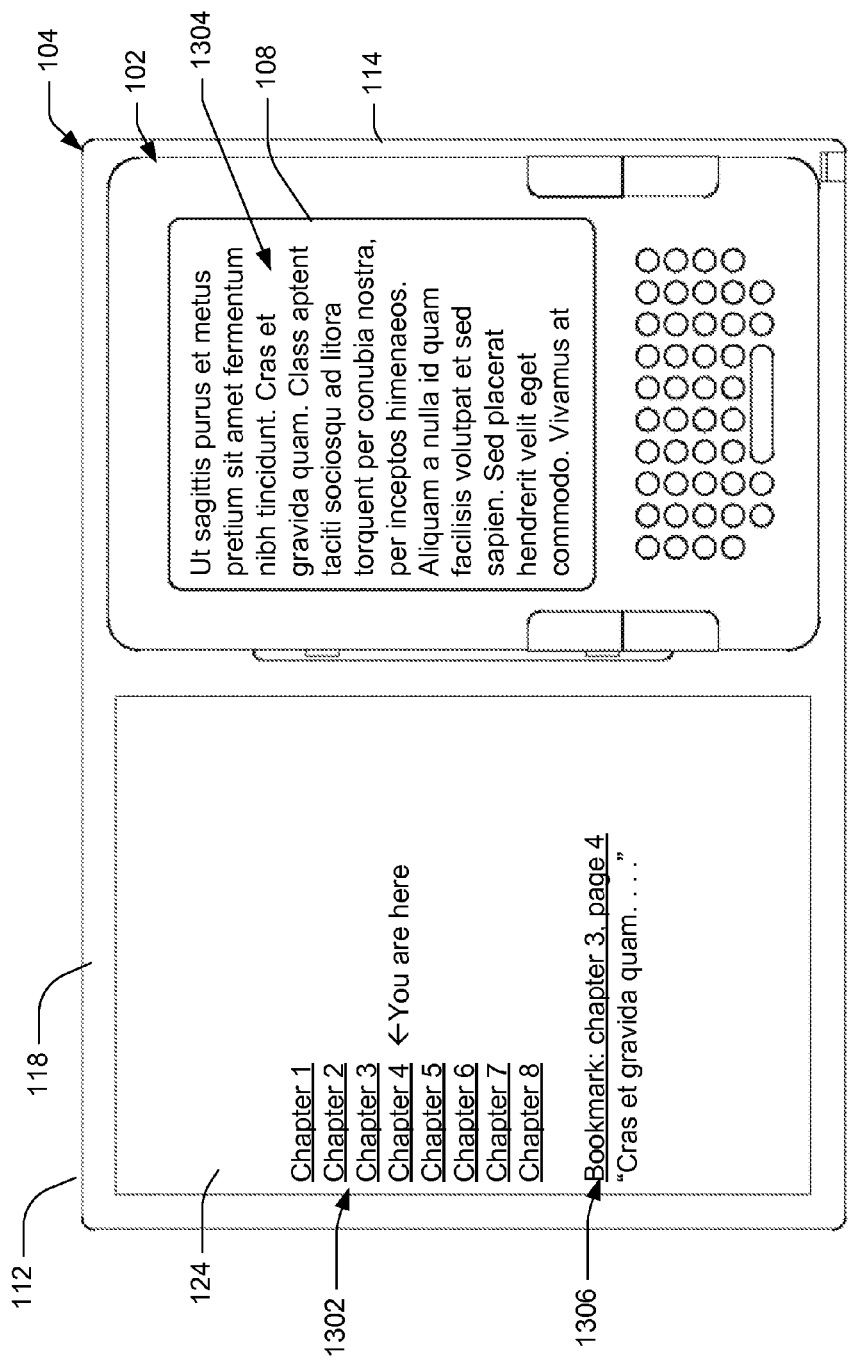

FIG. 13 shows an example in which a table of contents 1302 for a currently rendered eBook 1304 is displayed on the cover display 104. In addition, the display indicates the present location of the user within the table of contents, with the text "You are here". In other embodiments, the cover display 104 might display navigation information for a series or set of related eBooks. For example, it might indicate that the user is currently at chapter 5 in the second book of an identified trilogy.

The illustrated example also shows a bookmark 1306 that the user has entered.

In some embodiments, the user may be able to select the chapters or bookmarks to navigate to the corresponding locations with the rendered eBook 1304.

Although the examples above demonstrate several different display configurations, various other configurations are possible. For example, a cover display might be positioned on either the inner or outer surface of the rear flap. Additionally, the rear flap of the cover may in certain embodiments be configured to extend beyond the right side of the eBook reader device, and one or more displays might be positioned on the surface that is visible to the right of the reader device. Furthermore, certain covers may have additional folding segments, any of which might be utilized for additional cover displays.

Coupler

FIG. 14 illustrates an example of the coupler 122, also referred to as an accessory attachment. The coupler 122 can be configured to provide both mechanical and electrical coupling between an eBook reader device and an eBook cover. In embodiments where the eBook cover receives its power from the eBook reader device, power may be supplied through the coupler 122. In embodiments in which the eBook cover and the eBook reader device communicate with each other to determine cover display content, such communications may be implemented through the coupler 122. In different embodiments, the couple may provide power, communications, or both.

Coupler 122 is shown in the context of an eBook reader device 1402 and an associated eBook cover 1404 having a front cover flap 1406 and a rear cover flap 1408. The eBook reader device 1402 has a first accessory connector 1410 and a second accessory connector 1412. Coupler 122 is configured to engage the first accessory connector 1410 and the second accessory connector 1412 and to mechanically and/or electrically couple the eBook reader device 1402 and the eBook cover 1404.

Figure 15:
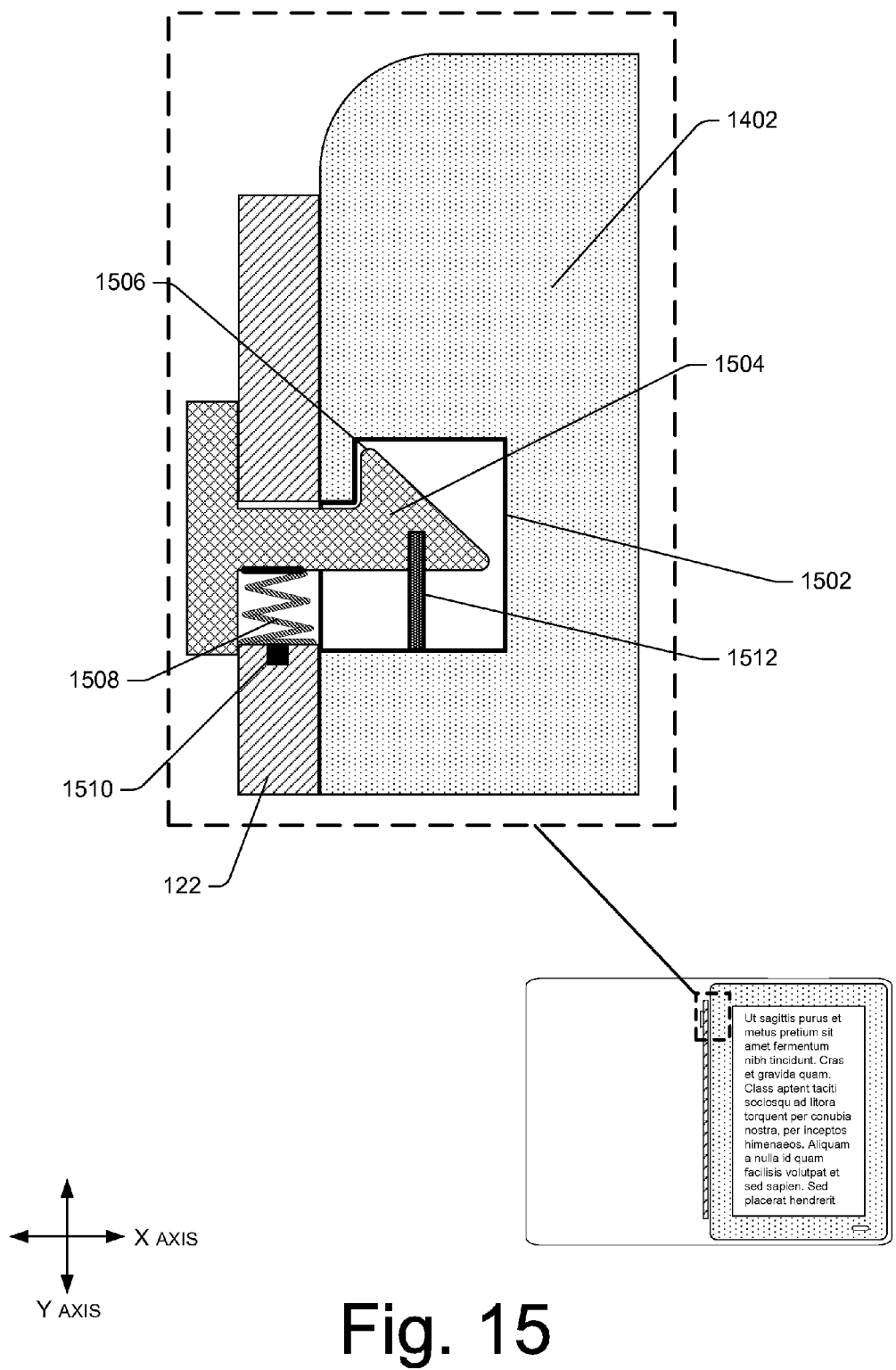
FIG. 15 is an enlarged cutaway view of the first accessory connector of the eBook reader device.

FIG. 15 depicts an enlarged cutaway view of the first accessory connector 1410 of the eBook reader device 1402. This cutaway view from above illustrates a first slot 1502 or receptacle, which is configured to accept a first engagement member attached to the coupler 122. The coupler 122 in turn is coupled to the cover 1404. As shown here, in some implementations, the first engagement member may comprise a first hook 1504. A connector body incorporating the first slot 1502 may comprise metal, a glass-reinforced plastic, a ceramic, and so forth. The first hook 1504 is movably engaged with the coupler 122 and includes a button for actuation by a user. The first hook 1504, as shown, incorporates a first hook barb 1506, configured to engage at least a portion of the first slot 1502. In other implementations the first hook 1504 may utilize another feature configured to provide mechanical engagement with the first slot 1502, or a portion thereof.

At least a portion of the first hook 1504 may be configured to provide an electrical pathway. For example, the first hook 1504 may comprise a conductive material, may be plated with a conductor, and so forth. A conductive spring 1508, wire, contact, flexible printed circuit, or other electrical connection provides an electrical pathway from the conductive material of the first hook 1504 to a conductor 1510. Conductor 1510 in turn couples to one or more active devices in the cover 1404. The same or an additional spring (or other flexible material) may be configured to bias the first hook 1504 to a latched position when a user is not applying pressure to the first hook 1504.

A contact 1512 is disposed within the first slot 1502 and is configured to couple with at least a part of the conductive portion of the first hook 1504. An outline of the contact 1512 is shown with a broken line within the area of the first hook 1504. In some implementations, the contact 1512 may be disposed to touch the top, bottom, or sides of the first hook 1504. Once coupled, an electrical pathway, suitable for carrying electrical power, data signals, and so forth, is established between the eBook reader device 1402 and the cover 1404. A single conductive pathway may be provided, as shown in this illustration. In other implementations additional conductive pathways on the first hook 1504 and corresponding additional contacts in the first slot 1502 may be provided. In some implementations where the first accessory connector is configured to provide mechanical support only, the contact may be omitted from the first accessory connector 1410.

Figure 16:
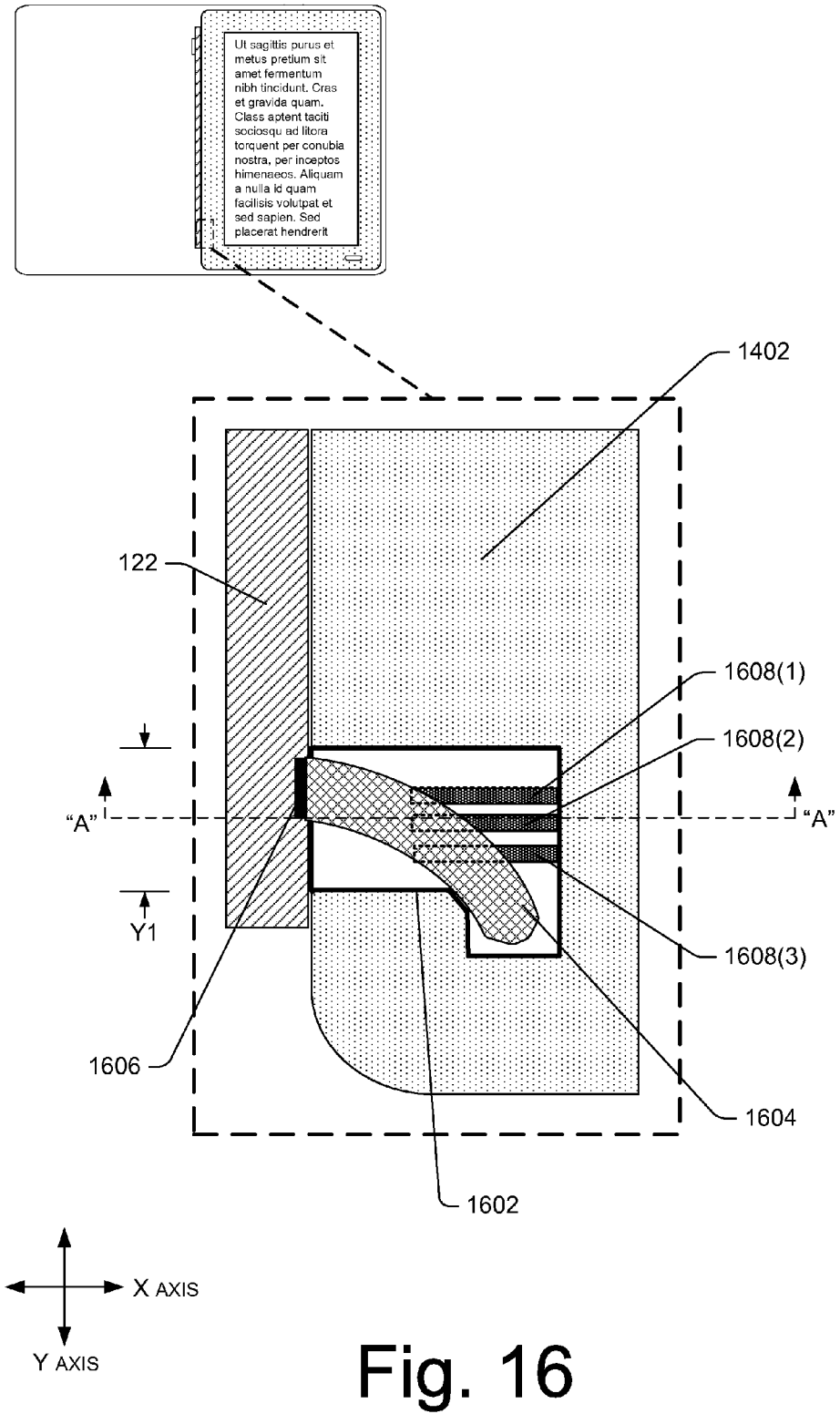
FIG. 16 is an enlarged cutaway view of the second accessory connector of the eBook reader device with an engaged curved hook.

FIG. 16 depicts an enlarged cutaway view of the second accessory connector 1412 of the eBook reader device 1402 of FIG. 1. In this cutaway view from above, a second slot 1602 or receptacle is configured to accept a second engagement member attached to the coupler 122. The second slot 1602 may have a width as shown by line Y1 of about eight millimeters in one implementation. The coupler 122 in turn is coupled to the cover 1404. As shown here, in some implementations, the second engagement member may comprise an arcuate second hook 1604. A connector body incorporating the second slot 1602 may comprise metal, a glass-reinforced plastic, ceramic, and so forth. As shown here, the second hook 1604 may fixedly engage to the coupler 122. In some implementations, the second hook 1604 may be configured to be moveably engaged to the coupler 122.

The second hook 1604 is configured to provide mechanical coupling, electrical coupling, or both between the cover 1404 and the eBook reader device 1402. To provide for the electrical coupling, at least a portion of the first hook 1504 may comprise or may be plated with a conductive material. The conductive material provides an electrical pathway from contacts within the second slot 1602 to a conductor 1606. This conductor 1606 in turn couples with one or more active components within the cover 1404.

One or more electrical contacts 1612(1), 1612(2), . . . , 1612(D) may also reside within the second slot 1602. These contacts may comprise spring contacts, wiper contacts, and so forth, and may used for power and/or data communications. While this figure illustrates three contacts 1612(1), 1612(2), and 1612(3), other implementations may employ a fewer or greater number of contacts. This illustration shows outlines of the contacts with broken lines within the area of the second hook 1604. Specific contacts may be configured with a geometry differing from the data contacts 1612(1)-(D). For example a ground contact might in some embodiments be longer and extend such it engages the second hook 1604 before other contacts that are used for power or data.

In other implementations, the contacts may be disposed on other surfaces of the slot 1602. For example, two contacts may be disposed above the second hook 404 and may be configured to engage conductors disposed on the complementary proximate surface, while two contacts reside below the second hook 1604.

Figure 17:
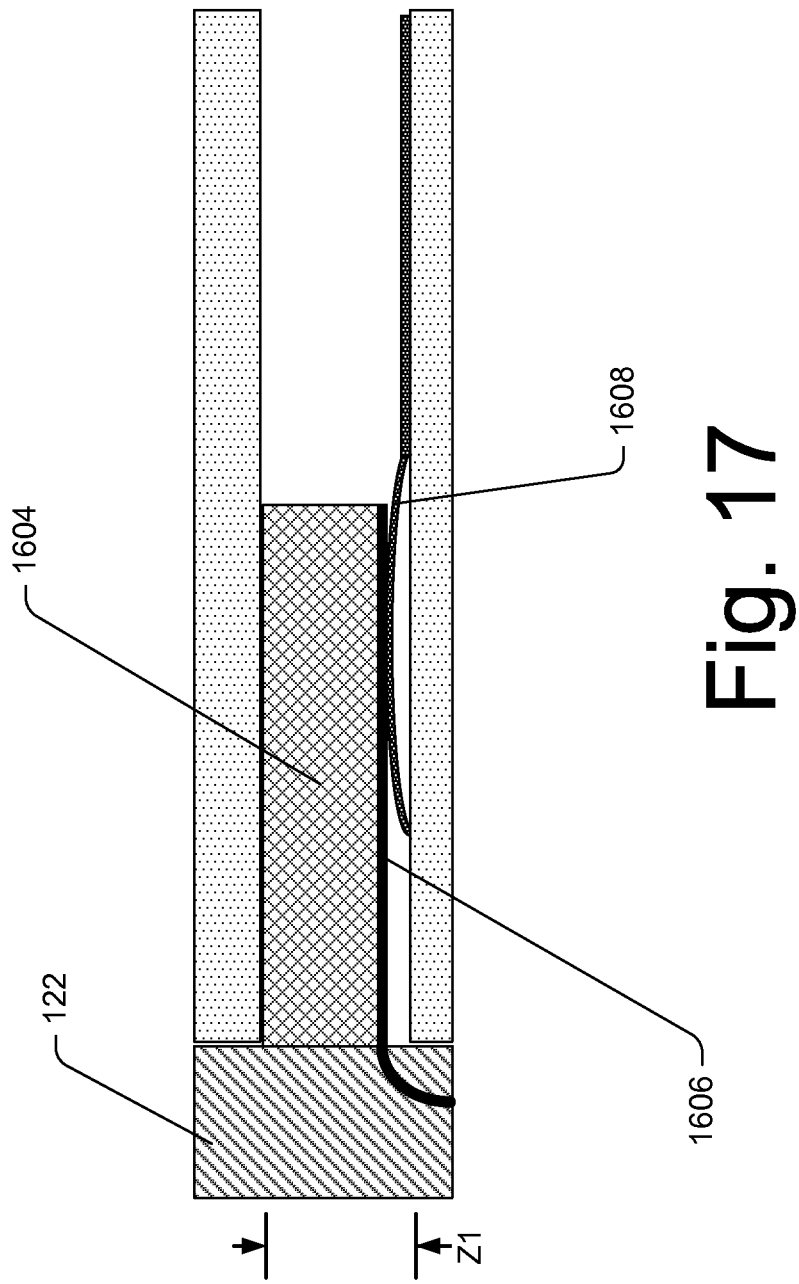
FIG. 17 is an enlarged cross section of the second accessory connector.

FIG. 17 illustrates an enlarged cross section of the second accessory connector 1510 of FIG. 15 along line A-A. This cross section illustrates the body of the second hook 1604. The conductor 1606 resides on a surface of the second hook 1604 and proximate to the contact 1608 in this example. As shown here, the conductor 1606 comprises a coating or layer upon the second hook 1604. However, in some implementations the second hook 1604 may itself comprise a suitably conductive material, such as aluminum, conductive plastic, and so forth. As shown here, the contacts 1608 comprise spring contacts. Upon engagement, the second hook 1604 depresses the contact 1608 and provides at least an electrical coupling. In some implementations, the contacts may be of the same or similar geometry to one another, while in other implementations they may not.

Although not shown, a plurality of conductors 1606 may be disposed upon the second hook 1604 such that only specific contacts within the second slot 1602 couple to each of the plurality of conductors once the second hook 1604 is fully engaged.

The illustrated accessory connectors 1410 and 1412 comprise very low profiles. For instance, the height of the second slot 1602 as shown by line Z1 may be about less than 1 millimeter (e.g., 0.81 millimeters) in one implementation.

FIG. 18 illustrates a perspective view of contacts within the second accessory connector 1410. As described above, contacts may differ in geometry from one another, or they may not. For example, and as illustrated, the ground contact 1608 and the detect contact 1610 are longer than the data contacts 1612(1)-(2) along the "X" axis. Thus, as shown above with regards to FIG. 16, the second hook 1604 couples to the ground contact 1608 and the detect contact 1610 when the second hook 1604 is fully engaged. However, the data contacts 1612(1)-(2) remain uncoupled in this example. While the width and height of the contacts is depicted as approximately the same, in some implementations each of these dimensions may vary from one contact to another.

FIGS. 19A and 19B each illustrate a cross section of a spring contact configuration. Spring contacts may be comprised of resilient materials, such as metal or plastic, and a conductive material. These materials may be of a generally elliptical cross section, such as spring wire, a rectangular cross section such as in a leaf spring, and so forth. For example, a spring contact may have a nickel base with a gold coating, although multiple other combinations are similarly possible.

FIG. 19A illustrates a double arc contact having an arcuate contact area 1904A for coupling with the hook or a plug, while an internal contact area 1906A comprises a second arcuate internal contact arc 1902. The internal contact arc 1902 may couple to the eBook reader device 1902 via an electrical pathway or to another component within the eBook reader device 1902 via spring contact, soldering, adhesive, and so forth.

FIG. 19B, meanwhile, illustrates a double spring contact 1908. The double spring contact 1908 comprises a generally wave-like cross section having an arcuate contact area 1904B for coupling with the hook or plug, as well as an arcuate internal contact area 1906B. The double spring contact 1908 may be utilized in situations where the eBook reader device 1402 couples to the coupler 122 body via contact. Thus, rather than soldering, conductive adhesives, or adding a spring contact to another component, a coupler using the double spring contact 1908 may be emplaced and, upon assembly, a conductive trace on a complementary component establishes an electrical pathway.

Various means of attachment can also be found in the following United States Patent Applications, which are hereby incorporated by reference: "Application Attachment Mechanism," Ser. No. 12/418,387, filed Apr. 3, 2009; and "Low Profile Mechanical and Electrical Accessory Connector," Ser. No. 12/815,904, filed Jun. 15, 2010.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A cover for a handheld electronic book reader device, the cover comprising:
   a front flap that is moveable to be positioned over a reader display of the handheld electronic book reader device, the front flap having opposed inner and outer surfaces;
   one or more attachment elements that detachably couple the cover to the handheld electronic book reader device;
   a cover display on one or both of the inner and outer surfaces of the front flap; and
   control logic configured to:
      receive supplemental content from the handheld electronic book reader device, the supplemental content being related to an electronic book that is displayed via the handheld electronic book reader device, the supplemental content being different than content of the electronic book; and cause the cover display to display the supplemental content.

2. A cover as recited in claim 1, wherein the cover display is on the outer surface of the front flap to display the supplemental content when the cover is closed.

3. A cover as recited in claim 1, wherein the cover display is on the inner surface of the front flap to show the supplemental content when the handheld electronic book reader device is in use.

4. A cover as recited in claim 1, wherein the cover display is further configured to display book cover art and to visually age the book cover art in response to usage of the electronic book.

5. A cover as recited in claim 1, wherein the supplemental content indicates user progress through the electronic book.

6. An electronic book reader device comprising:
a reader display that is configured to present content of an electronic book; and
a cover that is configured to be positioned over the reader display and that includes one or more cover displays and operational logic configured to:
receive information indicating that at least a portion of the content of the electronic book is currently being displayed on the reader display;
receive, from a source remote from the electronic book reader device, supplemental content that is determined to be related to the content of the electronic book, the supplemental content being different than the content of the electronic book; and
display, on the one or more cover displays, the supplemental content.

7. An electronic book reader device as recited in claim 6, wherein:
the cover has a front flap with an inner surface and an outer surface;
the cover has a back flap;
at least a first one of the one or more cover displays is positioned on the inner surface; and
at least a second one of the one or more cover displays is positioned on the outer surface.

8. An electronic book reader device as recited in claim 6, wherein:
the cover has a plurality of edges; and
at least one of the one or more cover displays is positioned on one of the plurality of edges.

9. An electronic book reader device as recited in claim 6, wherein:
the cover has a spine edge; and
at least one of the one or more cover displays is positioned on the spine edge.

10. An electronic book reader device as recited in claim 6, wherein the supplemental content indicates progress through the electronic book.

11. An electronic book reader device as recited in claim 6, wherein the operational logic is configured to implement a user navigational interface in conjunction with at least one of the one or more cover displays.

12. An electronic book reader device as recited in claim 6, wherein the operational logic is configurable by a user to display information designated by the user on at least one of the one or more cover displays.

13. An electronic book reader device as recited in claim 6, wherein the operational logic is configurable to display electronic book information on at least one of the one or more cover displays.

14. An electronic book reader device as recited in claim 6, wherein the supplemental content comprises at least one of a user electronic book wishlist or suggestion list.

15. An electronic book reader device as recited in claim 6, wherein the supplemental content indicates what other users are reading.

16. An electronic book reader device as recited in claim 6, wherein the supplemental content comprises user information.

17. A cover for a handheld electronic device that includes a display, the cover comprising:
a wireless communication component configured to transmit data wirelessly to the handheld electronic device;
a front flap that is moveable to be positioned over the display of the handheld electronic device;
a first electronic cover display configured to display an advertisement to promote a product or service; and
a second electronic cover display positioned on an outer spine of the cover and having a first side and a second side, the first side being hingeably connected to the front flap and the second side being hingeably connected to the electronic cover display.

18. A cover as recited in claim 17, wherein:
the front flap has inner and outer surfaces; and
the first electronic cover display is positioned on one of the inner or outer surfaces.

19. A cover as recited in claim 17, wherein:
the cover has a plurality of edges; and
the first electronic cover display is positioned on one of the plurality of edges.

20. A cover as recited in claim 17, further comprising a data coupler comprising a first accessory connector and a second accessory connector spaced apart from each other and the first accessory connector configured to provide a conductive pathway.

21. A cover as recited in claim 17, wherein the cover is configurable by a user to display information designated by the user on the electronic cover display.

22. A cover as recited in claim 17, wherein the cover is configurable to display user-designated pictures on the first electronic cover display.

23. A cover as recited in claim 17, further comprising a data coupling for communications with the handheld electronic device.

24. A cover as recited in claim 17, wherein the handheld electronic device is configured to display electronic books, and further comprising:
a data coupling for communications with the handheld electronic device;
the cover being configured to receive electronic book supplemental information from the handheld electronic device for display on the first electronic cover display.

25. A cover as recited in claim 17, wherein the handheld electronic device is configured to display electronic books, and further comprising:
a data coupling for communications with the handheld electronic device;
the cover being configured to receive electronic book reading progress information from the handheld electronic device for display on the first electronic cover display.

26. A cover as recited in claim 17, further comprising a memory port configured to communicate with a removable memory device.

27. A cover as recited in claim 17, further comprising a memory port configured to communicate with a removable memory device, wherein the cover is configured to display content stored on the removable memory device.

28. A cover for an electronic book reader device, the cover comprising:
control logic configured to receive, from at least one of a content server or the electronic reader device, book cover art for an electronic book that is displayed via the electronic book reader device, the book cover art representing a cover of the electronic book;
a display configured to display the book cover art; and
a coupler configured to detachably couple to the electronic book reader device and receive power from the electronic book reader device.

29. A cover as recited in claim 28, wherein the control logic is further configured to cause the display to display user interface data.

30. A cover as recited in claim 28, wherein the control logic is further configured to cause the display to display electronic book supplementary materials.

31. A cover as recited in claim 28, wherein the control logic is further configured to wirelessly receive the cover art from a content server.

32. A cover as recited in claim 28, wherein the control logic is further configured to cause the display to display electronic book progress data.

33. A cover as recited in claim 28, wherein the control logic is further configured to cause the display to display electronic book bibliographic data.

34. A method comprising:
receiving, by a cover for a handheld electronic book reader device, supplemental content from a source remote from the handheld electronic book reader device, the supplemental content being associated with an electronic book displayed on the handheld electronic book reader device, the supplemental content being different than content of the electronic book; and
at least partly in response to the receiving, presenting the supplemental content on one or more displays of the cover.

35. A method as recited in claim 34, further comprising presenting cover art associated with the electronic book.

36. A method as recited in claim 34, further comprising:
receiving, from the handheld electronic book reader device, progress information based on a current position in the electronic book displayed on the handheld electronic book reader device; and
displaying, on the one or more displays of the cover and based on the progress information, a progress indicator that indicates progress through the electronic book.

* * * * *